United States Patent
Frank et al.

(10) Patent No.: US 7,210,220 B2
(45) Date of Patent: May 1, 2007

(54) APPARATUS FOR AND METHOD OF FORMING SEALS IN FUEL CELLS AND FUEL STACKS

(75) Inventors: David G. Frank, Scarborough (CA); Joseph Cargnelli, Toronto (CA); Lawrence Eugene Frisch, Midland, MI (US); William Gordon Bradford, Midland, MI (US); Myron Timothy Maxson, Sanford, MI (US); Brian Jeffery Swanton, Saginaw, MI (US); Howard Stimson Travis, Midland, MI (US)

(73) Assignee: Hydrogenics Corporation, Mississauga (CA)

( * ) Notice: Subject to any disclaimer, the term of this patent is extended or adjusted under 35 U.S.C. 154(b) by 56 days.

(21) Appl. No.: 10/706,925

(22) Filed: Nov. 14, 2003

(65) Prior Publication Data

US 2005/0091837 A1    May 5, 2005

Related U.S. Application Data

(63) Continuation of application No. PCT/US02/15387, filed on May 15, 2002, which is a continuation-in-part of application No. 09/854,362, filed on May 15, 2001, now Pat. No. 6,852,439.

(51) Int. Cl.
    *H01M 2/08* (2006.01)
(52) U.S. Cl. .............................. 29/731; 29/730; 429/35; 429/36; 429/38; 429/39
(58) Field of Classification Search .................. 429/35, 429/36, 38, 39; 29/730, 623.1, 623.2
    See application file for complete search history.

(56) References Cited

U.S. PATENT DOCUMENTS

| | | | |
|---|---|---|---|
| 2,614,906 A | 10/1952 | Spialter et al. | |
| 3,043,660 A | 7/1962 | Hughes et al. | |
| 3,377,309 A | 4/1968 | Harper | |
| 3,677,998 A | 7/1972 | Young | |
| 3,794,558 A | 2/1974 | Young | |
| 3,960,800 A | 6/1976 | Kohl, Jr. | |
| 4,050,700 A * | 9/1977 | Lifferth | 277/643 |

(Continued)

FOREIGN PATENT DOCUMENTS

EP    0122150 A2    10/1984

(Continued)

*Primary Examiner*—Bruce F. Bell
(74) *Attorney, Agent, or Firm*—Bereskin & Parr

(57) ABSTRACT

A sealing technique is provided for forming complex and multiple seal configurations for fuel cells and other electrochemical cells. To provide a seal, for sealing chambers for oxidant, fuel and/or coolant, a groove network is provided extending through the various elements of the fuel cell assembly. A source of seal material is then connected to an external filling port and injected into the groove network, and the seal material is then cured to form the seal. There is thus formed a "seal in place", that is robust and can accommodate variations in tolerances and dimensions, and that can be bonded, where possible, to individual elements of the fuel cell assembly. This avoids the difficulty, labor intensive cost and complexity of manually assembling many individual gaskets into complex groove shapes and the like. The seal material can be selected to be comparable with a wide variety of gases, liquid coolants and the like.

31 Claims, 18 Drawing Sheets

U.S. PATENT DOCUMENTS

| | | | |
|---|---|---|---|
| 4,269,991 | A | 5/1981 | Homan et al. |
| 4,397,917 | A * | 8/1983 | Chi et al. .................... 429/26 |
| 4,719,262 | A | 1/1988 | Plueddemann |
| 4,766,176 | A | 8/1988 | Lee et al. |
| 4,772,031 | A | 9/1988 | Poppo |
| 4,784,879 | A | 11/1988 | Lee et al. |
| 4,786,568 | A | 11/1988 | Elmore et al. |
| 4,874,667 | A | 10/1989 | Lee et al. |
| 5,077,249 | A | 12/1991 | Lee et al. |
| 5,116,558 | A | 5/1992 | Wrobel et al. |
| 5,176,966 | A * | 1/1993 | Epp et al. .................... 429/26 |
| 5,877,256 | A | 3/1999 | Nakamura et al. |
| 5,908,888 | A | 6/1999 | Nakamura et al. |
| 5,973,067 | A | 10/1999 | Nakamura et al. |
| 5,977,249 | A | 11/1999 | Kovar et al. |
| 6,057,054 | A * | 5/2000 | Barton et al. ................ 429/42 |
| 6,080,503 | A * | 6/2000 | Schmid et al. ............... 429/35 |
| 6,086,643 | A * | 7/2000 | Clark et al. ................ 29/623.2 |
| 6,130,272 | A | 10/2000 | Dopp et al. |
| 6,153,326 | A | 11/2000 | Matsukawa et al. |
| 6,165,634 | A * | 12/2000 | Krasij et al. ................ 429/35 |
| 6,231,053 | B1 * | 5/2001 | Wakamatsu .................. 277/628 |
| 6,337,120 | B1 * | 1/2002 | Sasaki et al. ............... 428/66.4 |
| 6,338,492 | B1 * | 1/2002 | Schilling et al. ............ 277/630 |
| 6,371,489 | B1 | 4/2002 | Combet et al. |
| 6,399,234 | B2 * | 6/2002 | Bonk et al. .................... 429/32 |
| 6,436,568 | B1 * | 8/2002 | Schilling et al. ............... 429/35 |
| 6,495,278 | B1 * | 12/2002 | Schmid et al. ................ 429/30 |
| 6,531,236 | B1 | 3/2003 | Hatoh et al. |
| 6,596,427 | B1 * | 7/2003 | Wozniczka et al. ........... 429/32 |
| 6,670,017 | B2 | 12/2003 | Huang et al. |
| 6,716,550 | B1 * | 4/2004 | Kirby .......................... 429/35 |
| 6,761,991 | B2 * | 7/2004 | Frisch et al. .................. 429/35 |
| 2002/0068212 | A1 | 6/2002 | Osenar et al. |
| 2002/0117780 | A1 | 8/2002 | Inoue et al. |
| 2002/0122970 | A1 | 9/2002 | Inoue et al. |
| 2004/0028983 | A1 | 2/2004 | Hayashi et al. |
| 2004/0258977 | A1 * | 12/2004 | Frank et al. .................. 429/35 |

FOREIGN PATENT DOCUMENTS

| | | |
|---|---|---|
| EP | 0 349 248 A2 | 1/1990 |
| EP | 0 870 587 A2 | 10/1998 |
| EP | 1 009 052 A1 | 6/2000 |
| EP | 1 075 034 A1 | 2/2001 |
| EP | 1 156 546 A1 | 11/2001 |
| EP | 1 263 068 A1 | 12/2002 |
| JP | 61-227368 | 10/1986 |
| JP | 2001-338673 | 12/2001 |
| JP | 2002-313398 | 10/2002 |
| JP | 2002-343372 | 11/2002 |
| WO | WO 02/17422 A2 | 2/2002 |
| WO | WO 02/43173 | 5/2002 |

* cited by examiner

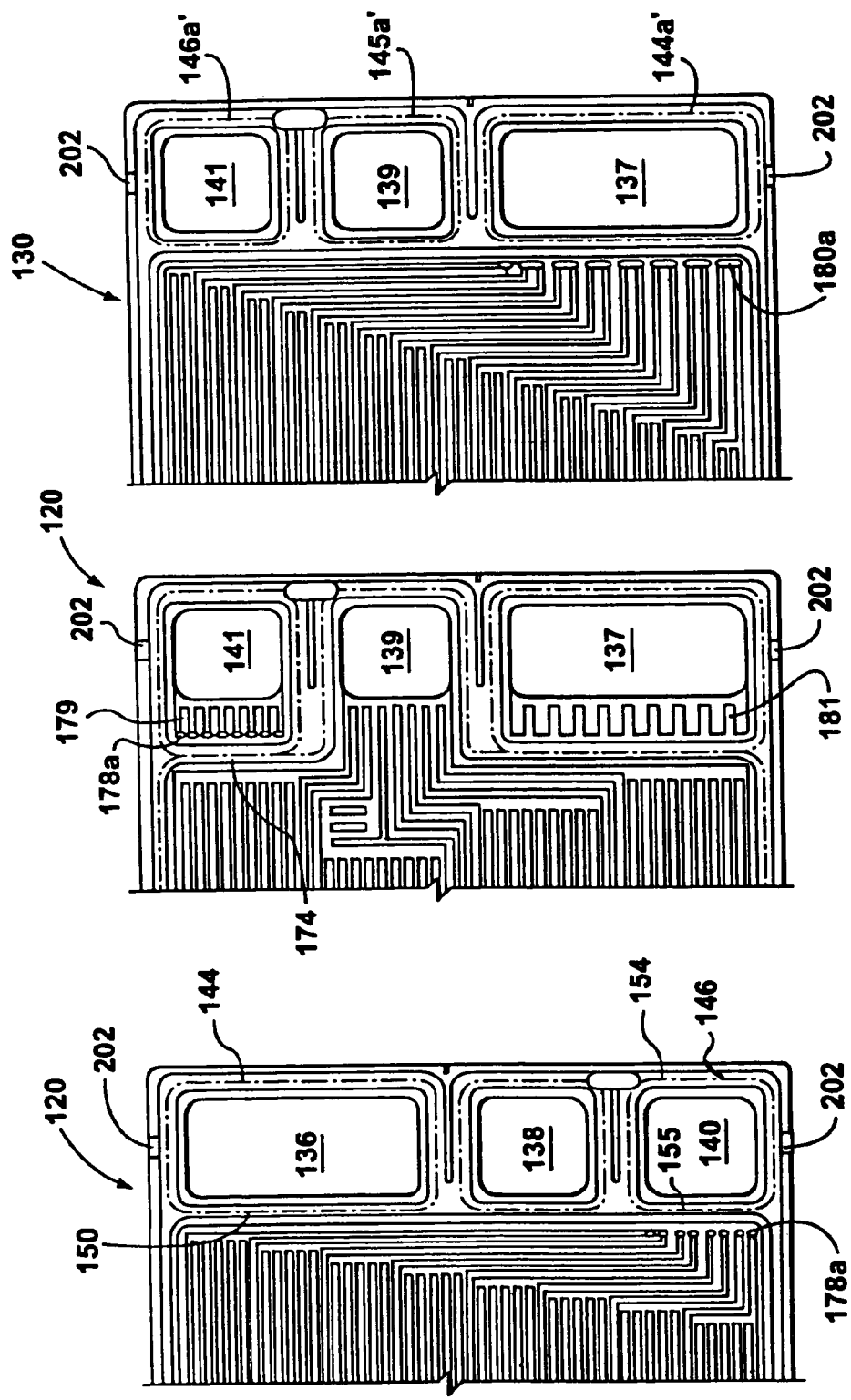

APPARATUS FOR AND METHOD OF FORMING SEALS IN FUEL CELLS AND FUEL STACKS

CROSS-REFERENCE TO RELATED APPLICATIONS

This application is a continuation of international application number PCT/US02/15387, filed on May 15, 2002, which is a continuation-in-part of U.S. application Ser. No. 09/854,362, filed May 15, 2001, now U.S. Pat. No. 6,852,439.

FIELD OF THE INVENTION

This invention relates to fuel cells, and this invention more particularly is concerned with an apparatus and a method of forming seals between different elements of a conventional fuel cell or fuel stack assembly, to prevent leakage of gases and liquids required for operation of the individual fuel cells. The invention also relates to a method of forming seals with a novel seal material.

BACKGROUND OF THE INVENTION

There are various known types of fuel cells. One form of fuel cell that is currently believed to be practical for usage in many applications is a fuel cell employing a proton exchange membrane (PEM). A PEM fuel cell enables a simple, compact fuel cell to be designed, which is robust, which can be operated at temperatures not too different from ambient temperatures and which does not have complex requirements with respect to fuel, oxidant and coolant supplies.

Conventional fuel cells generate relatively low voltages. In order to provide a useable amount of power, fuel cells are commonly configured into fuel cell stacks, which typically may have 10, 20, 30 or even 100's of fuel cells in a single stack. While this does provide a single unit capable of generating useful amounts of power at usable voltages, the design can be quite complex and can include numerous elements, all of which must be carefully assembled.

For example, a conventional PEM fuel cell requires two flow field plates, an anode flow field plate and a cathode flow field plate. A membrane electrode assembly (MEA), including the actual proton exchange membrane is provided between the two plates. Additionally, a gas diffusion media (GDM) is provided, sandwiched between each flow field plate and the proton exchange membrane. The gas diffusion media enables diffusion of the appropriate gas, either the fuel or oxidant, to the surface of the proton exchange membrane, and at the same time provides for conduction of electricity between the associated flow field plate and the PEM.

This basic cell structure itself requires two seals, each seal being provided between one of the flow field plates and the PEM. Moreover, these seals have to be of a relatively complex configuration. In particular, as detailed below, the flow field plates, for use in the fuel cell stack, have to provide a number of functions and a complex sealing arrangement is required.

For a fuel cell stack, the flow field plates typically provide apertures or openings at either end, so that a stack of flow field plates then define elongate channels extending perpendicularly to the flow field plates. As a fuel cell requires flows of a fuel, an oxidant and a coolant, this typically requires three pairs of ports or six ports in total. This is because it is necessary for the fuel and the oxidant to flow through each fuel cell. A continuous flow through ensures that, while most of the fuel or oxidant as the case may be is consumed, any contaminants are continually flushed through the fuel cell.

The foregoing assumes that the fuel cell would be a compact type of configuration provided with water or the like as a coolant. There are known stack configurations, which use air as a coolant, either relying on natural convection or by forced convection. Such cell stacks typically provide open channels through the stacks for the coolant, and the sealing requirements are lessened. Commonly, it is then only necessary to provide sealed supply channels for the oxidant and the fuel.

Consequently, each flow field plate typically has three apertures at each end, each aperture representing either an inlet or outlet for one of fuel, oxidant and coolant. In a completed fuel cell stack, these apertures align, to form distribution channels extending through the entire fuel cell stack. It will thus be appreciated that the sealing requirements are complex and difficult to meet. However, it is possible to have multiple inlets and outlets to the fuel cell for each fluid depending on the stack/cell design. For example, some fuel cells have 2 inlet ports for each of the anode, cathode and coolant, 2 outlet ports for the coolant and only 1 outlet port for each of the cathode and anode. However, any combination can be envisioned.

For the coolant, this commonly flows across the back of each fuel cell, so as to flow between adjacent, individual fuel cells. This is not essential however and, as a result, many fuel cell stack designs have cooling channels only at every 2nd, 3rd or 4th (etc.) plate. This allows for a more compact stack (thinner plates) but may provide less than satisfactory cooling. This provides the requirement for another seal, namely a seal between each adjacent pair of individual fuel cells. Thus, in a completed fuel cell stack, each individual fuel cell will require two seals just to seal the membrane electrode assembly to the two flow field plates. A fuel cell stack with 30 individual fuel cells will require 60 seals just for this purpose. Additionally, as noted, a seal is required between each adjacent pair of fuel cells and end seals to current collectors. For a 30 cell stack, this requires an additional 31 seals. Thus, a 30 cell stack would require a total of 91 seals (excluding seals for the bus bars, insulator plates and endplates), and each of these would be of a complex and elaborate construction. With the additional gaskets required for the bus bars, insulator plates and endplates the number reaches 100 seals, of various configurations, in a single 30 cell stack.

Commonly the seals are formed by providing channels or grooves in the flow field plates, and then providing prefabricated gaskets in these channels or grooves to effect a seal. In known manner, the gaskets (and/or seal materials) are specifically polymerized and formulated to resist degradation from contact with the various materials of construction in the fuel cell, various gasses and coolants which can be aqueous, organic and inorganic fluids used for heat transfer. However, this means that the assembly technique for a fuel cell stack is complex, time consuming and offers many opportunities for mistakes to be made. Reference to a resilient seal here refers typically to a floppy gasket seal molded separately from the individual elements of the fuel cells by known methods such as injection, transfer or compression molding of elastomers. By known methods, such as insert injection molding, a resilient seal can be fabricated on a plate, and clearly assembly of the unit can then be simpler, but forming such a seal can be difficult and expensive due to inherent processing variables such as mold wear, tolerances in fabricated plates and material changes. In addition custom made tooling is required for each seal and plate design.

An additional consideration is that formation or manufacture of such seals or gaskets is complex. There are typically two known techniques for manufacturing them.

For the first technique, the individual gasket is formed by molding in a suitable mold. This is relatively complex and expensive. For each fuel cell configuration, it requires the design and manufacture of a mold corresponding exactly to the shape of the associated grooves in the flow field plates. This does have the advantage that the designer has complete freedom in choosing the cross-section of each gasket or seal, and in particular, it does not have to have a uniform thickness.

A second, alternative technique is to cut each gasket from a solid sheet of material. This has the advantage that a cheaper and simpler technique can be used. It is simply necessary to define the shape of the gasket, in a plan view, and to prepare a cutting tool to that configuration. The gasket is then cut from a sheet of the appropriate material of appropriate thickness. This does have the disadvantage that, necessarily, one can only form gaskets having a uniform thickness. Additionally, it leads to considerable wastage of material. For each gasket, a portion of material corresponding to the area of a flow field plate must be used, yet the surface area of the seal itself is only a small fraction of the area of the flow field plate.

A fuel cell stack, after assembly, is commonly clamped to secure the elements and ensure that adequate compression is applied to the seals and active area of the fuel cell stack. This method ensures that the contact resistance is minimized and the electrical resistance of the cells are at a minimum. To this end, a fuel cell stack typically has two substantial end plates, which are configured to be sufficiently rigid so that their deflection under pressure is within acceptable tolerances. The fuel cell also typically has current bus bars to collect and concentrate the current from the fuel cell to a small pick up point and the current is then transferred to the load via conductors. Insulation plates may also be used to isolate, both thermally and electrically, the current bus bars and endplates from each other. A plurality of elongated rods, bolts and the like are then provided between the pairs of plates, so that the fuel cell stack can be clamped together between the plates, by the tension rods. Rivets, straps, piano wire, metal plates and other mechanisms can also be used to clamp the stack together. To assemble the stack, the rods are provided extending through one of the end plates. An insulator plate and then a bus bar (including seals) are placed on top of the endplate, and the individual elements of the fuel cell are then built up within the space defined by the rods or defined by some other positioning tool. This typically requires, for each fuel cell, the following steps:

(a) placing a seal to separate the fuel cell from the preceding fuel cell;

(b) locating a flow field plate on the seal;

(c) locating a seal on the first flow field plate;

(d) placing a GDM within the seal on the flow field plate;

(e) locating a membrane electrode assembly (MEA) on the seal;

(f) placing an additional GDM on top of the MEA;

(g) preparing a further flow field plate with a seal and placing this on top of the membrane electrode assembly, while ensuring the seal of the second plate falls around the second GOM;

(h) this second or upper flow field plate then showing a groove for receiving a seal, as in step (a).

This process needs to be repeated until the last cell is formed and it is then topped off with a bus bar, insulator plate and the final end plate.

It will be appreciated that each seal has to be carefully placed, and the installer has to ensure that each seal is fully and properly engaged in its sealing groove. It is very easy for an installer to overlook the fact that a small portion of a seal may not be properly located. The seal between adjacent pairs of fuel cells, for the coolant area, may have a groove provided in the facing surfaces of the two flow field plates. Necessarily, an installer can only locate the seal in one of these grooves, and must rely on feel or the like to ensure that the seal properly engages in the groove of the other plate during assembly. It is practically impossible to visually inspect the seal to ensure that it is properly seated in both grooves.

As mentioned, it is possible to mold seals directly onto the individual cells. While this does offer an advantage during assembly when compared to floppy seals, such as better tolerances and improved part allocation, it still has many disadvantages over the technique of the present invention namely, alignment problems with the MEA, multiple seals and molds required to make the seals and more steps are required for a completed product than the methods proposed by the present invention.

Thus, it will be appreciated that assembling a conventional fuel cell stack is difficult, time consuming, and can often lead to sealing failures. After a complete stack is assembled, it is tested, but this itself can be a difficult and complex procedure. Even if a leak is detected, this may initially present itself simply as an inability of the stack to maintain pressure of a particular fluid, and it may be extremely difficult to locate exactly where the leak is occurring, particularly where the leak is internal. Even so, the only way to repair the stack is to disassemble it entirely and to replace the faulty seal. This will result in disruption of all the other seals, so that the entire stack and all the different seals then have to be reassembled, again presenting the possibility of misalignment and failure of any one seal.

A further problem with conventional techniques is that the clamping pressure applied to the entire stack is, in fact, intended to serve two quite different and distinct functions. These are providing a sufficient pressure to ensure that the seals function as intended, and to provide a desired pressure or compression to the gas diffusion media, sandwiched between the MEA itself and the individual flow field plates. If insufficient pressure is applied to the GDM, then poor electrical contact is made; on the other hand, if the GDM is over compressed, flow of gas can be compromised. Unfortunately, in many conventional designs, it is only possible to apply a known, total pressure to the overall fuel cell stack. There is no way of knowing how this pressure is divided between the pressure applied to the seals and the pressure applied to the GDM. In conventional designs, this split in the applied pressure depends entirely upon the design of the individual elements in the fuel cell stack and maintenance of appropriate tolerances. For example, the GDM commonly lie in center portions of flow field plates, and if the depth of each center portion varies outside acceptable tolerances, then this will result in incorrect pressure being applied to the GDM. This depth may depend to what extent a gasket is compressed also, affecting the sealing properties, durability and lifetime of the seal.

For all these reasons, manufacture and assembly of conventional fuel cells is time consuming and expensive. More particularly, present assembly techniques are entirely unsuited to large-scale production of fuel cells on a production line basis.

SUMMARY OF THE INVENTION

In accordance with the invention of our issued U.S. Pat. No. 6,852,439, there is provided a fuel cell assembly comprising:

a plurality of separate elements;

at least one groove network extended throughout the fuel cell assembly and including at least one filling port for the at least one groove network; and a seal within each groove network that has been formed in place after assembly of said separate elements, wherein the seal provides a seal between at least two of said separate elements to define a chamber for a fluid for operation of the fuel cell.

Seal compositions in accordance with the invention are detailed below, and it is noted that these are suitable for temperatures in the range −55 to 250° C. In accordance with the present invention a seal that has been formed in place in a fuel cell assembly, which would comprise no more than an individual fuel cell, or as detailed below, some other electrochemical cell is designated as a "seal in place" cell stack, or construction.

In accordance with the present invention, there is provided a method of forming a seal in an electrochemical cell assembly comprising a plurality of separate elements, the method comprising:

(a) assembling the separate elements of the fuel cell together;

(b) providing a groove network extending through the separate elements and a filling port open to the exterior in communication with the groove network;

(c) connecting a source of seal material to the filling port and injecting the seal material into the groove network to fill the groove network and simultaneously venting gas from the groove network; and (d) curing the seal material, to form a seal filling the groove network.

The composition of the seal preferably comprises a linear polysilioxane polymer with either terminal or pendant unsaturated organic groups —CH=CH2. The polysiloxane can be a homopolymer of dimethyl polysiloxane or a homopolymer of methyltrifuoropropyl polysiloxane or a copolymer of dimethyl and methylfluoropropyl polysiloxane. The methyltrifluoropropyl content can be adjusted to provide increased robustness, chemical resistance where mild and aggressive hydrocarbon based coolants are used. Additive to the specific polymer composition, combinations of: extending fillers, cure systems such as platinum silicon hydrides and peroxides, thermal and acid scavengers such as metal oxides or hydroxides as well as adhesion promoters can be added to meet the unique requirements of fuel cell construction and operating requirements for long life operation.

The method of the present invention provides a number of advantages over conventional constructions employing separate gaskets. Firstly, the invention allows efficient and accurate clamping and position of the membrane active area of each fuel cell. In contrast, in conventional techniques, all the elements of a multi-cell stack are assembled with the elements slightly spaced apart, and it is only the final clamping that draws all the elements together in their final, clamped position; this can make it difficult to ensure accurate alignment of different elements in the stack. The tolerance requirements for grooves for the seal can be relaxed considerably, since it is no longer necessary for them to correspond to a chosen gasket dimension. The liquid material injected can compensate for a wide range of variations in groove dimensions. Combining these attributes of the invention allows the utilization of significantly thinner plate constructions. The current trend in fuel cell design calls for thinner and thinner flow plates, with the intention of reducing the overall dimensions of a fuel cell stack of a given power. Using the sealing technique of the present invention, the grooves can have a relatively thin bottom wall, i.e. the wall opposite the open side of the groove. This is because when the stack is first assembled, there is no pressure in the groove, and, in an assembled condition, the configuration can be such as to provide support for any thin-walled sections. Only after assembly is the sealing material injected and cured.

Use of a liquid sealant that is cured to form an elastomeric material allows the use of materials designed to chemically bond to various elements of the fuel cell stack, thereby ensuring and/or enhancing the seal performance. This should also increase the overall durability of the fuel cell stack. Also, it is anticipated that some fuel cell stack designs will use aggressive coolants, e.g. glycols, and with the present invention it is a simple matter to select a seal material compatible with the coolant and other fluids present.

A related advantage from the facets of the invention listed above is that it provides for a more economic construction. As noted, it is not necessary for grooves to be formed to accurate dimensions. Additionally, no complex tooling is required for gaskets and there is no wastage of gasket material as occurs when cutting gaskets from sheet material. Thus, when designing a fuel cell stack in accordance with the present invention, it is simply necessary to design and manufacture the individual elements of the stack, and it is not necessary to provide for separate manufacture of new and different gaskets.

In addition, the ability of the seal to bond the elements together facilitates the production of membrane electrode units (MEU). As detailed below, such membrane electrode units could each comprise a single fuel cell or a small number of fuel cells. Each unit would have end surfaces adapted for mating within surfaces of corresponding membrane electrode units, e.g. to form coolant chambers; for this purpose, a seal can be molded on one or both ends of each membrane electrode unit. The membrane electrode units can then be assembled and clamped together to form a fuel cell stack of a desired power level.

The present invention can employ, liquid seal material comprising of:

(a) 100 parts by weight of polydiorganosiloxane containing 2 or more silicon-atom-bonded alkenyl groups in each molecule;

(b) 5 to 50 parts by weight of reinforcing filler;

(c) 1 to 20 parts by weight of an oxide or hydroxide of an alkaline-earth metal with an atomic weight of 40 or greater;

(d) an organohydrogensiloxane containing 3 or more silicon-atom-bonded hydrogen atoms in each molecule, in an amount providing a molar ratio of the silicon-atom-bonded hydrogen atoms in this ingredient to the silicon-atom-bonded alkenyl groups in ingredient (a) in a range of 0.4:1 to 5:1;

(e) a platinum-type metal catalyst in an amount providing 0.1 to 500 parts by weight of platinum-type metal per 1 million parts by weight of ingredient (a);

(f) optionally, 0.1–5.0 parts by weight of organic peroxide with or without ingredient (e);

(g) optionally, 0.01–5.0 parts by weight inhibitors; and (h) optionally, 0 to 100 parts by weight of non-reinforcing extending fillers.

In accordance with a further aspect of the present invention, there is provided a method of forming seals in a fuel cell assembly by injecting a sealing material into a groove network within the fuel cell assembly, the method including injecting a curable seal material containing:

(a) 100 parts by weight of a polydiorganosiloxane containing two or more silicon-atom-bonded alkenyl groups in each molecule;

(b) 5–50 parts by weight of a reinforcing filler;

(c) 1–20 parts by weight of an oxide or hydroxide of an alkaline earth metal with an atomic weight of 40 or greater;

(d) an organohydrogensiloxane containing three or more silicon-atom-bonded hydrogen atoms in each molecule, the hydrogen atoms being present in an amount providing a molar ratio of silicon-atom-bonded hydrogen atoms in component (d) to silicon-atom-bonded alkenyl groups in component (a) which is in a range of 0.4:1 to 5:1; and (e) a platinum-type metal catalyst in an amount providing 0.1–500 parts by weight of platinum-type metal per one million parts by weight of component (a).

In addition to its applicability to fuel cells, the present invention is generally applicable to electrochemical cells. Accordingly, two further aspects of the present invention provide:

an electrochemical cell assembly comprising: a plurality of separate elements; at least one groove network extending through the electrochemical cell assembly and including at least one filling port for the groove network; and a seal within each groove network that has been formed in place after assembly of said separate elements, wherein the seal defines a barrier between at least two elements to define a chamber for a fluid for operation of the electrochemical cell assembly; and a method of forming a seal in an electrochemical cell assembly comprising a plurality of separate elements, the method comprising:

(a) assembling the separate elements of the electrochemical cell assembly together;

(b) providing a groove network extending through the separate elements and a filling port open to the exterior in communication with the groove network;

(c) connecting a source of uncured liquid seal material to the filling port and injecting the seal material into the groove network to fill the groove network and simultaneously venting gas from the groove network; and (d) curing the seal material, to form a seal in the groove network.

BRIEF DESCRIPTION OF THE DRAWING FIGURES

For a better understanding of the present invention and to show more clearly how it may be carried into effect, reference will now be made, by way of example, to the accompanying drawings which show, by way of example, a preferred embodiment of the present invention and in which:

FIG. 17 shows a variant of one end of the front face of the anode bipolar flow field plate, the other end corresponding;

FIG. 18 shows a variant of one end of the rear face of the anode bipolar flow field plate, the other end corresponding;

FIG. 19 shows a variant of one end of the front face of the cathode bipolar flow field plate, the other end corresponding;

DESCRIPTION OF THE PREFERRED EMBODIMENT

Figure 1A:
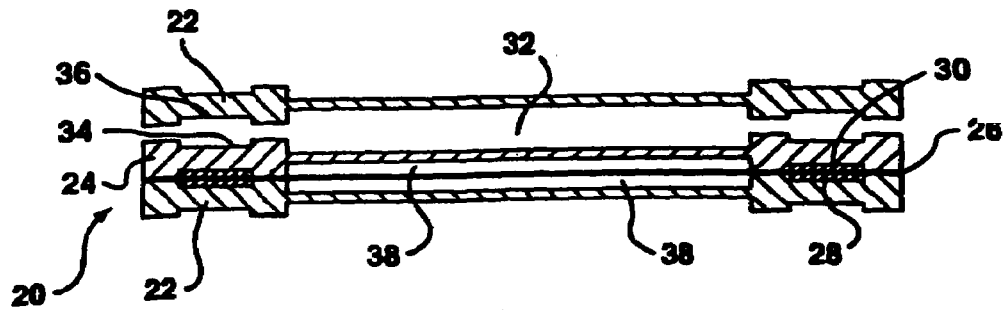
FIG. 1a shows, schematically, a sectional view through part of a fuel cell stack in accordance with a first embodiment of the present invention.

The first embodiment of the apparatus is shown in FIG. 1a and indicated generally by the reference 20. For simplicity, this Figure. shows just part of a fuel cell stack, as does FIG. 2. It will be understood that the other fuel cells in the stack correspond, and that the fuel cell stack would include conventional end elements, clamping elements and the like. In general, FIGS. 1a–3 are intended to indicate the essential elements of the individual embodiments of the invention, and it will be understood by someone skilled in this art that the fuel cell stacks would be otherwise conventional. Also in FIGS. 1a–e and 2, the proton exchange membrane is shown, for clarity, with exaggerated thickness, and as is known, it has a small thickness. In FIGS. 1a–e, the grooves for the seal material are shown schematically, and it is expected that the grooves will usually have a depth and width that are similar, i.e. a generally square cross-section. Note also that the bottom of the grooves can have any desired profile.

The first embodiment 20 shows a fuel cell including an anode bipolar plate 22 and a cathode bipolar plate 24. In known manner, sandwiched between the bipolar plates 22, 24 is a membrane electrode assembly (MEA) 26. In order to seal the MEA, each of the bipolar plates 22, 24 is provided with a respective groove 28, 30. This is a departure from conventional practice, as it is common to provide the flow plates with channels for gases but with no recess for gas diffusion media (GDM) or the like. Commonly, the thickness of seals projecting above the flow plates provides sufficient space to accommodate the GDM. Here, the flow plates are intended to directly abut one another, thereby giving much better control on the space provided for a complete MEA 26 and hence the pressure applied to the GDM. This should ensure better and more uniform performance from the GDM.

As is conventional, the MEA is considered to comprise a total of three layers, namely: a central proton exchange membrane layer (PEM); on both sides of the PEM, a layer of a finely divided catalyst, to promote reaction necessary on either side of the PEM. There are also two layers of gas diffusion media (GDM) located on either side of the PEM abutting the catalyst layers, and usually maintained pressed against the catalyst layers to ensure adequate electrical conductivity, but these two layers of GDM are not considered to be part of the MEA itself.

As shown for the cathode bipolar plate 24, this has a rear face that faces the rear face of another anode bipolar plate 22 of an adjacent fuel cell, to define a coolant channel 32. To seal the cathode bipolar plate 24 and the upper anode bipolar plate 22, again, grooves 34 and 36 are provided.

It will be understood that the anode and cathode bipolar plates 22, 24 define a chamber or cavity for receiving the MEA 26 and for gas distribution media (GDM) on either side of the MEA. The chambers or cavities for the GDM are indicated at 38.

Conventionally, for each pair of grooves 28, 30 and 34, 36, some form of pre-formed gasket will be provided. Now, in accordance with the present invention, the various grooves would be connected together by suitable conduits to form a continuous groove or channel. Then, a seal material is injected through these various grooves, so as to fill the grooves entirely. The sealant is then cured, e.g. by subjecting it to a suitable elevated temperature, to form a complete seal. This has a number of advantages. It does not require any pre-formed gasket to be formed, and as noted, this is identified as a "seal in place" construction. Yet, at the same time, the final seal can take on any desired shape, and in particular, can flow to fill in imperfections and allow for variations in tolerances on the various components.

Figure 4:
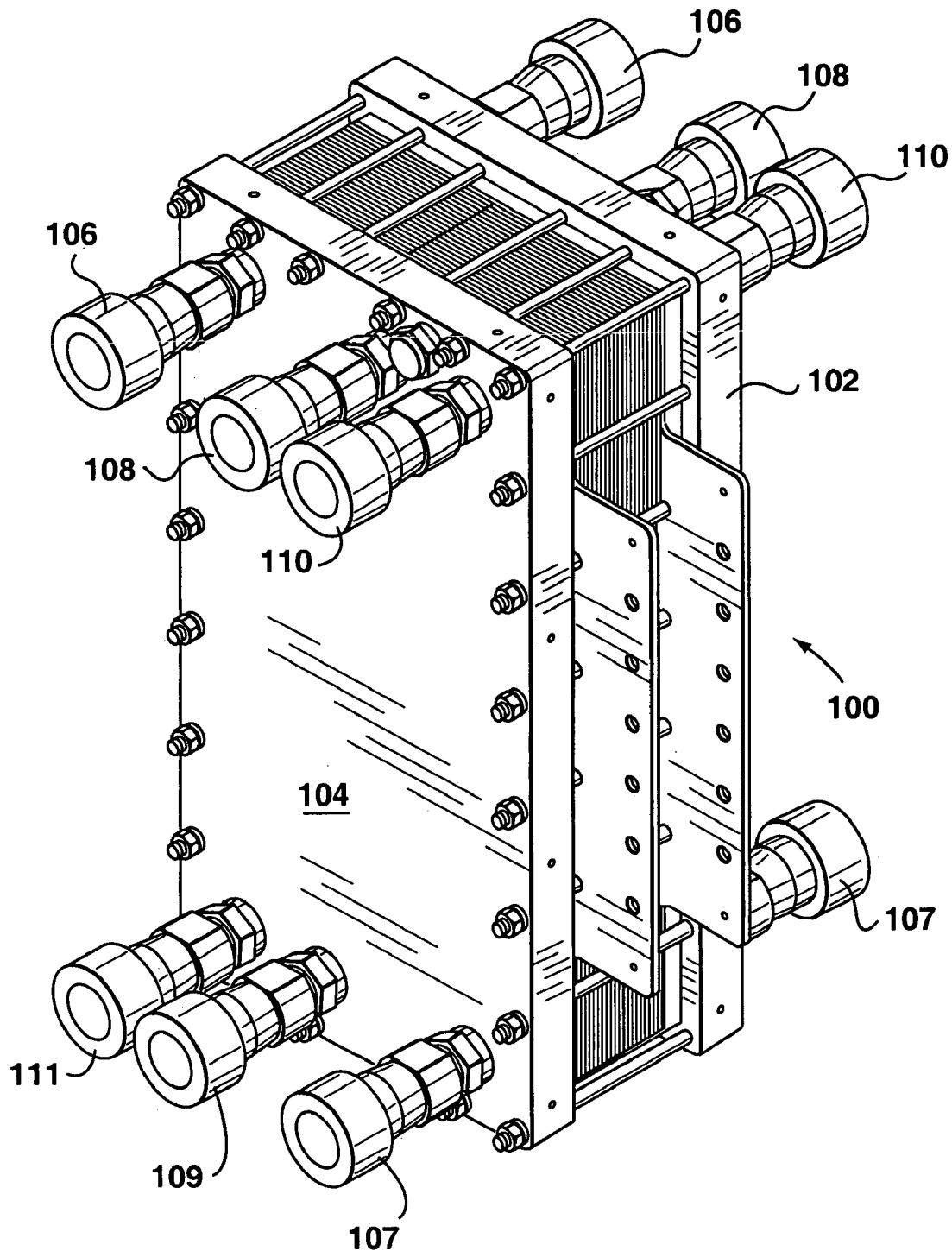
FIG. 4 shows an isometric view of a fuel cell stack in accordance with a fourth embodiment of the present invention.

It will be appreciated that FIG. 1a is intended simply to show the basic principle behind the invention, and does not show other elements essential for a complete fuel cell stack. For example, FIG. 1a does not address the issue of providing flows of gases and coolant to the individual fuel cells. The sealing technique of FIG. 1a is incorporated in the embodiment of FIG. 4 and later Figures, and these further aspects of the invention are further explained in relation to those Figures.

Figure 2:
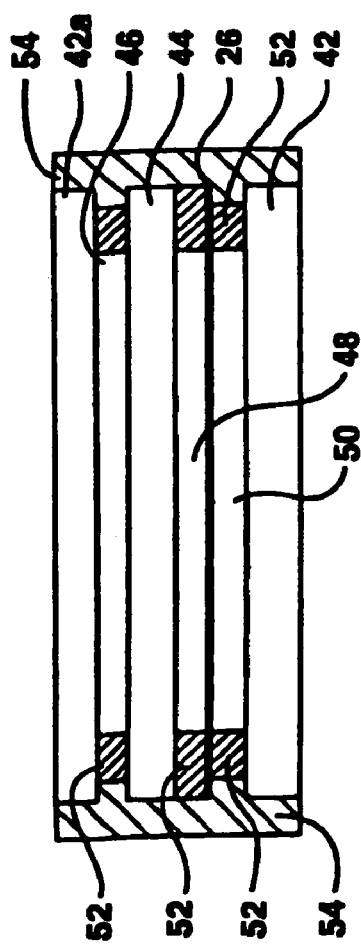
FIG. 2 shows, schematically, a sectional view through part of a fuel cell stack in accordance with a second embodiment of the present invention.

FIG. 2 shows an alternative arrangement. Here, the anode and cathode bipolar plates are indicated at 42, 44 and 42a, corresponding to plates 22 and 24 of FIG. 1a. The MEA is again indicated at 26. A coolant cavity is formed at 46, and cavities or chambers 48, 50 are provided for the GDM.

Here, as for FIG. 1a, the plates 42, 44 are designed to provide various cavities or grooves for seals 52 to be formed. Thus, a lowermost seal 52 provides a seal between the MEA 26 and the anode bipolar plate 42. On top of the MEA 26, a further seal 52 provides a seal to the cathode bipolar plate 44. These seals 52 are formed as in FIG. 1a, by first providing a network of grooves or channels across the flow field plate surface.

Now, in accordance with this second embodiment of the present invention, to provide an additional seal and additional security in sealing, a seal-in-place seal 54 is provided around the entire exterior of the fuel cell stack, as indicated. As for FIG. 1a, conventional ports and openings (not shown) would be provided for flow of gases and coolant to the fuel cell stack. To form this seal, the entire stack would be enclosed and ports and vents are provided to enable seal material to be injected to form the outer seal 54 and all the inner seals simultaneously. For this purpose, communication channels and ducts are provided between the grooves for the seals 52 and the exterior of stack where the seal 54 is formed. As before, once the material has been injected, it is cured at room (ambient) temperature or by heating at an elevated temperature. The final sealing material on the surface of the stack will serve two purposes, namely to seal the entire stack, and to electrically insulate the fuel cell stack.

In a variant of the FIG. 2 arrangement, rather than provide complete enclosed grooves, the grooves would be open to sides of the fuel cell stack. Then, to form the seals, the sides of the fuel cell stack would be closed off by a mold or the like, somewhat as in FIG. 3 (described below), but without providing any space for a complete external seal around the whole fuel cell stack.

Figure 3:
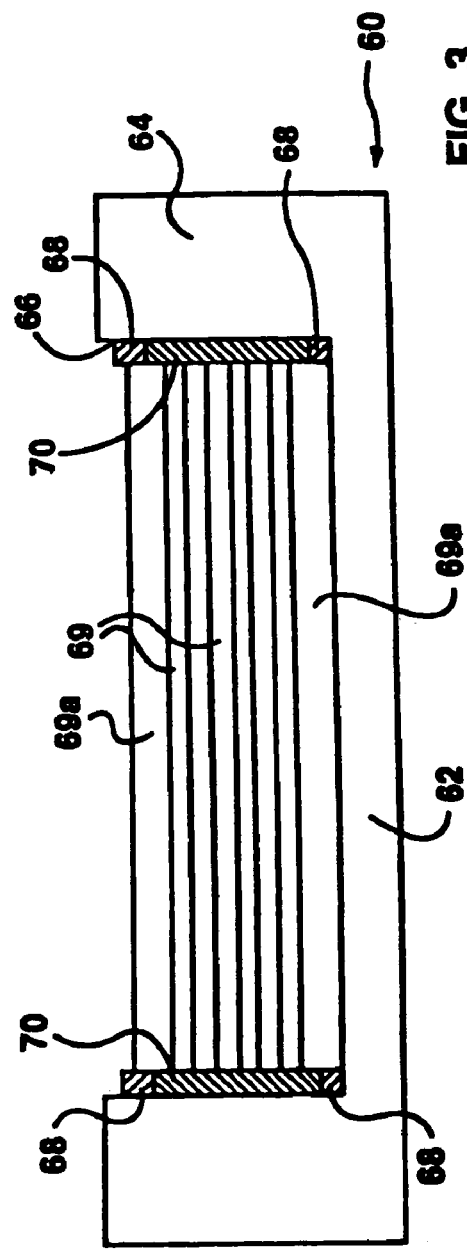
FIG. 3 shows a sectional view of an assembly device, for assembling a fuel cell stack in accordance with a further embodiment of the present invention.

FIG. 3 shows an assembly device indicated generally at 60, for forming a seal, somewhat as for the embodiment of FIG. 2. Here, it is anticipated that a fuel cell stack will first be assembled following known practice, but without inserting any seals. Thus, the various elements of the stack, principally the flow field plates and the MEAs will be sequentially assembled with appropriate end components. To align the components, clamping rods can be used by first attaching these to one end plate, or the components can be assembled in a jig dimensioned to ensure accurate alignment. Either way, with all the components in place the entire assembly is clamped together, commonly by using clamping rods, as mentioned, engaging both end plates. The assembly device 60 has a base 62 and a peripheral wall 64 defining a well 66. Additionally, there are upper and lower projections 68, for engaging the end plates to locate a fuel cell stack in position. Although FIG. 3 shows the projections 68 on just two sides of the fuel cell stack, it will be understood that they are provided on all four sides.

Then, an assembly of elements for a fuel cell stack comprising cathode and anode plates, MEAs, insulators, current bus bars, etc. is positioned within the well 66, with the projections 68 ensuring that there is a space around all of the anode and cathode plates and around at least parts of the end plates. Current collector plates usually have projecting tabs, for connection to cables etc. and accommodation and seals are provided for these. The various layers or plates of the stack are indicated schematically at 69 in FIG. 3, with the end plates indicated at 69a.

Then, in accordance with the present invention, a layer of material is injected around the outside of the stack, as indicated at 70. This then provides a seal somewhat in the manner of FIG. 2. Again, connections would be made to the groove network within the fuel cell stack, so that internal seals are formed simultaneously. In this case, venting would be provided in the end plates. Vent channels would be provided extending through the stack and out of the ends of the stack, and in communication with the groove networks within the stack itself.

It is also to be understood that prior to assembly, it will usually be necessary to clean these surfaces of the elements, and in some cases, to apply a primer. Thus, cleaning could be effected using first acetone, followed by isopropyl alcohol, where the surfaces are wiped down in between the two cleaning treatments.

As to the use of the primer, it is believed that this may be necessary in cases where the sealing material does not form an adequate bond for sealing to the large variety of different materials are used in fuel cells. For example, materials could include: titanium; stainless steel; gold; graphite; composite graphite; GRAFOIL® (trade mark of United Carbide); ABS (acrylonitrile-butadiene-styrene); Polycarbonate, polysulfone, thermoplastics; thermal set plastics; aluminum; teflon; or high density polyethylene. The primer can be applied, by brushing, rolling, spray application, screen transfer, or other known manner, as a liquid composition, optionally with a solvent carrier that evaporates, or the primer can be plated or dip coated onto the appropriate surfaces. It will be appreciated that the list does not cover all possible materials. Alternatively, the carrier can be incorporated into the material used to make a particular component, so that the surface properties of the component or element are altered, to form a good bond with the material used for forming the seal. In a further embodiment, the primer may be added to the sealant material prior to injection into the stack.

The primer can be a dilute solution of various types of reactive silanes and/or siloxanes in a solvent, as represented for example, in U.S. Pat. No. 3,377,309 (Apr. 9, 1968), U.S. Pat. No. 3,677,998 (Jul. 18, 1972), U.S. Pat. No. 3,794,556 (Feb. 26, 1974), U.S. Pat. No. 3,960,800 (Jun. 1, 1976), U.S. Pat. No. 4,269,991 (May 26, 1981), U.S. Pat. No. 4,719,262 (Jan. 12, 1988), and U.S. Pat. No. 5,973,067 (Oct. 26, 1999), all to Dow Corning Corporation, and the contents of which are incorporated by reference.

To cure the seal material, a curing temperature can usually be selected by selecting suitable components for the seal material. Curing temperatures of, for example, 30° C., 80° C., or higher can be selected. Curing temperature must be compatible with the materials of the fuel cells. It is also anticipated that, for curing at elevated temperatures, heated water could be passed through the stack which should ensure that the entire stack is promptly brought up to the curing temperature, to give a short curing cycle. As noted above, it also anticipated that the invention could use a seal material that cures at ambient temperature, so that no separate heating step is required. To vent air from the individual grooves during filling with the seal material, vents can be provided. It has been found in practice that a pattern of fine scratches, designed to provide adequate venting and to eliminate air bubble formation, can provide sufficient venting. The vents, where required, can have a variety of different configurations. Most simply, they are formed by providing a simple scratch with a sharp tool to surfaces of flow field plates and the like. However, the vents could be rectangular, oval, circular or any other desired profile. Preferably, the vents open to the exterior. However, the vents could open to any part of the stack that, at least during initial manufacture, is open to the atmosphere. For example, many of the interior chambers intended, in use, for reaction gases or coolant, will during manufacture be open to the atmosphere, and for some purposes, it may be permissible to have vents opening into these chambers. Alternatively, each individual element can be clamped lightly together so that pressure generated within the groove network is sufficient to force air out. The clamping, at the same time, maintains the flow field plates sufficiently close together such that material is prevented from escaping.

The invention is described in relation to a single groove network, but it is to be appreciated that multiple groove networks can be provided. For example, in complex designs, it may prove preferable to have individual, separated networks, so that flow of seal material to the individual networks can be controlled. Multiple, separate networks also offer the possibility of using different seal material for different components of a fuel cell assembly. Thus, as noted, a wide variety of different materials can be used in fuel cells. Finding seal materials and a primer that are compatible with the wide range of materials may be difficult. It may prove advantageous to provide separate networks, so that each seal material and primer pair need only be adapted for use with a smaller range of materials.

Reference will now be made to FIGS. 5–13 which show a preferred embodiment of the invention, and the fuel cell stack in these Figures is generally designated by the reference 100.

Figure 5:
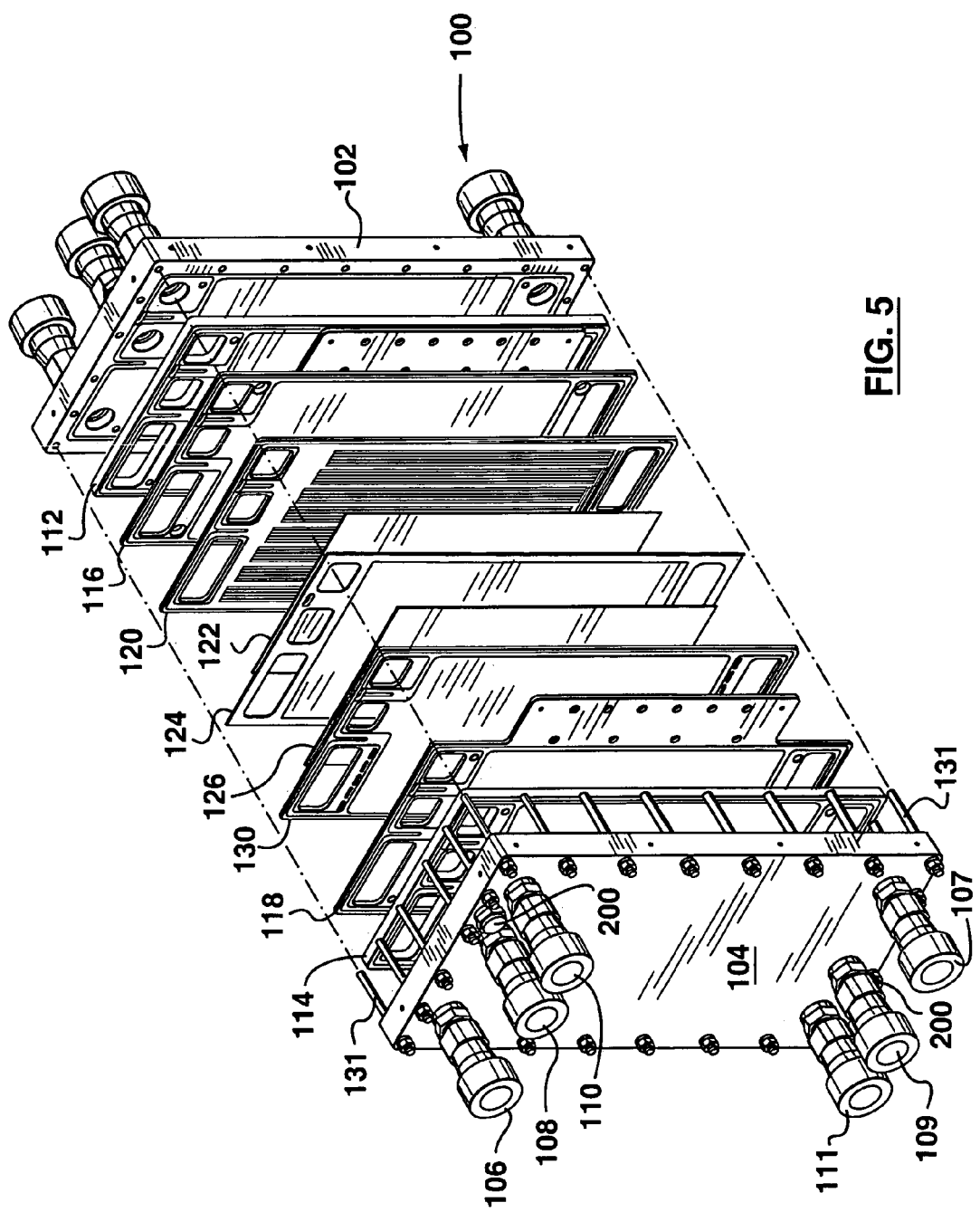
FIG. 5 shows an isometric exploded view of the fuel cell stack of FIG. 4, to show individual components thereof.

Referring first to FIGS. 5 and 6, there are shown the basic elements of the stack 100. Thus, the stack 100 includes an anode endplate 102 and cathode endplate 104. In known manner, the endplates 102, 104 are provided with connection ports for supply of the necessary fluids. Air connection ports are indicated at 106, 107; coolant connection ports are indicated at 108, 109; and hydrogen connection ports are indicated at 110, 111. Although not shown, it will be understood that corresponding air, coolant and hydrogen ports, corresponding to ports 106–111 would be provided on the anode side of the fuel cell stack. The various ports 106–111 are connected to distribution channels or ducts that extend through the fuel cell stack 100, as for the earlier embodiments. The ports are provided in pairs and extend all the way through the fuel cell stack 100, to enable connection of the fuel cell stack 100 to various equipment necessary. This also enables a number of fuel cell stacks to be connected together, in known manner.

Immediately adjacent the anode and cathode endplates 102, 104, there are insulators 112 and 114. Immediately adjacent the insulators, in known manner, there are an anode current collector 116 and a cathode current collector 118.

Between the current collectors 116, 118, there is a plurality of fuel cells. In this particular embodiment, there are ten fuel cells. FIG. 5, for simplicity, shows just the elements of one fuel cell. Thus, there is shown in FIG. 5 an anode flow field plate 120, a first or anode gas diffusion layer or media 122, a MEA 124, a second or cathode gas diffusion layer 126 and a cathode flow field plate 130.

To hold the assembly together, tie rods 131 are provided, which are screwed into threaded bores in the anode endplate 102, passing through corresponding plain bores in the cathode endplate 104. In known manner, nuts and washers are provided, for tightening the whole assembly and to ensure that the various elements of the individual fuel cells are clamped together.

Now, the present invention is concerned with the seals and the method of forming them. As such, it will be understood that other elements of the fuel stack assembly can be largely conventional, and these will not be described in detail. In particular, materials chosen for the flow field plates, the MEA and the gas diffusion layers are the subject of conventional fuel cell technology, and by themselves, do not form part of the present invention.

Figure 6A:
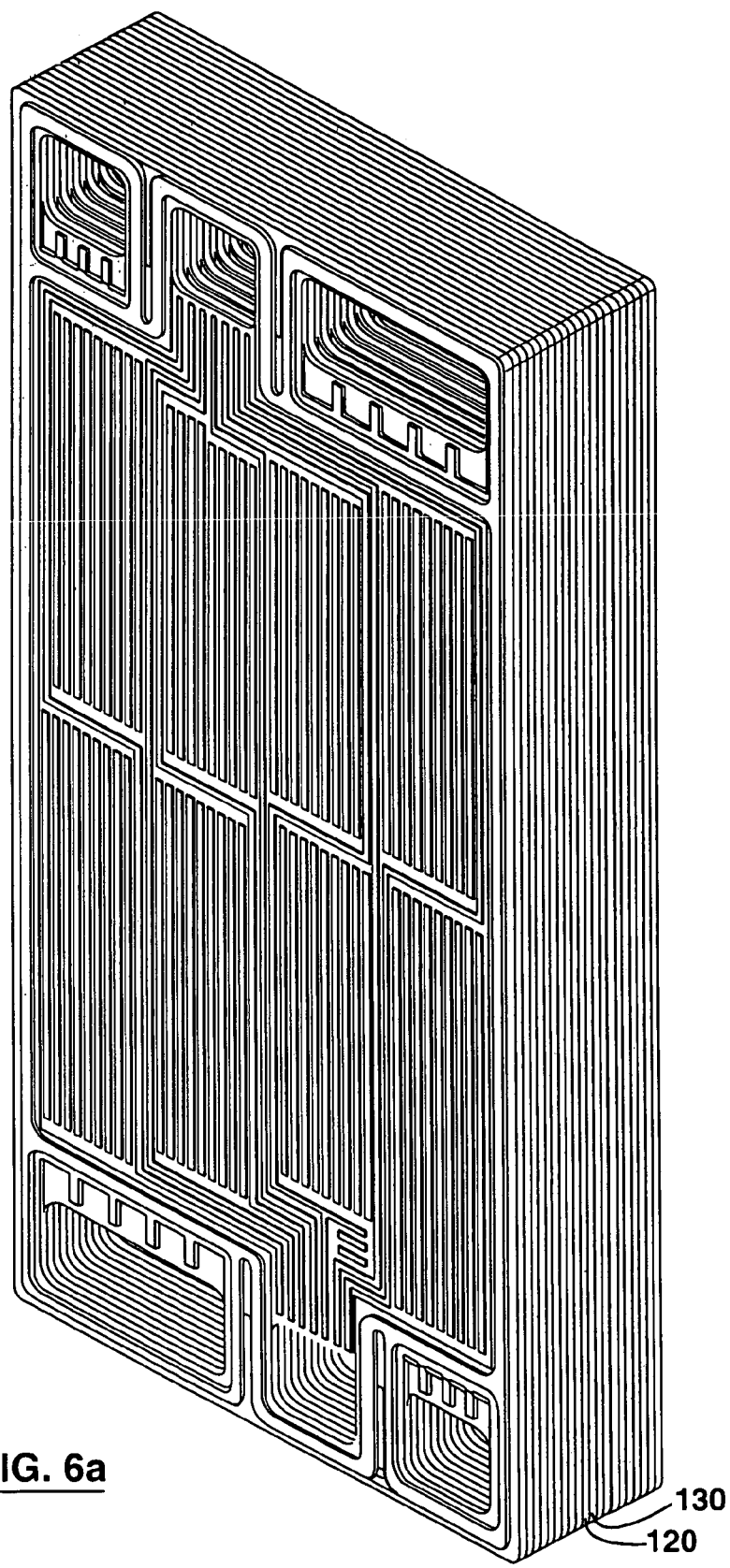
FIGS. 6a and 6b show, respectively, a twenty cell and a one hundred cell fuel cell stack according to the fourth embodiment of the present invention.
Figure 6B:
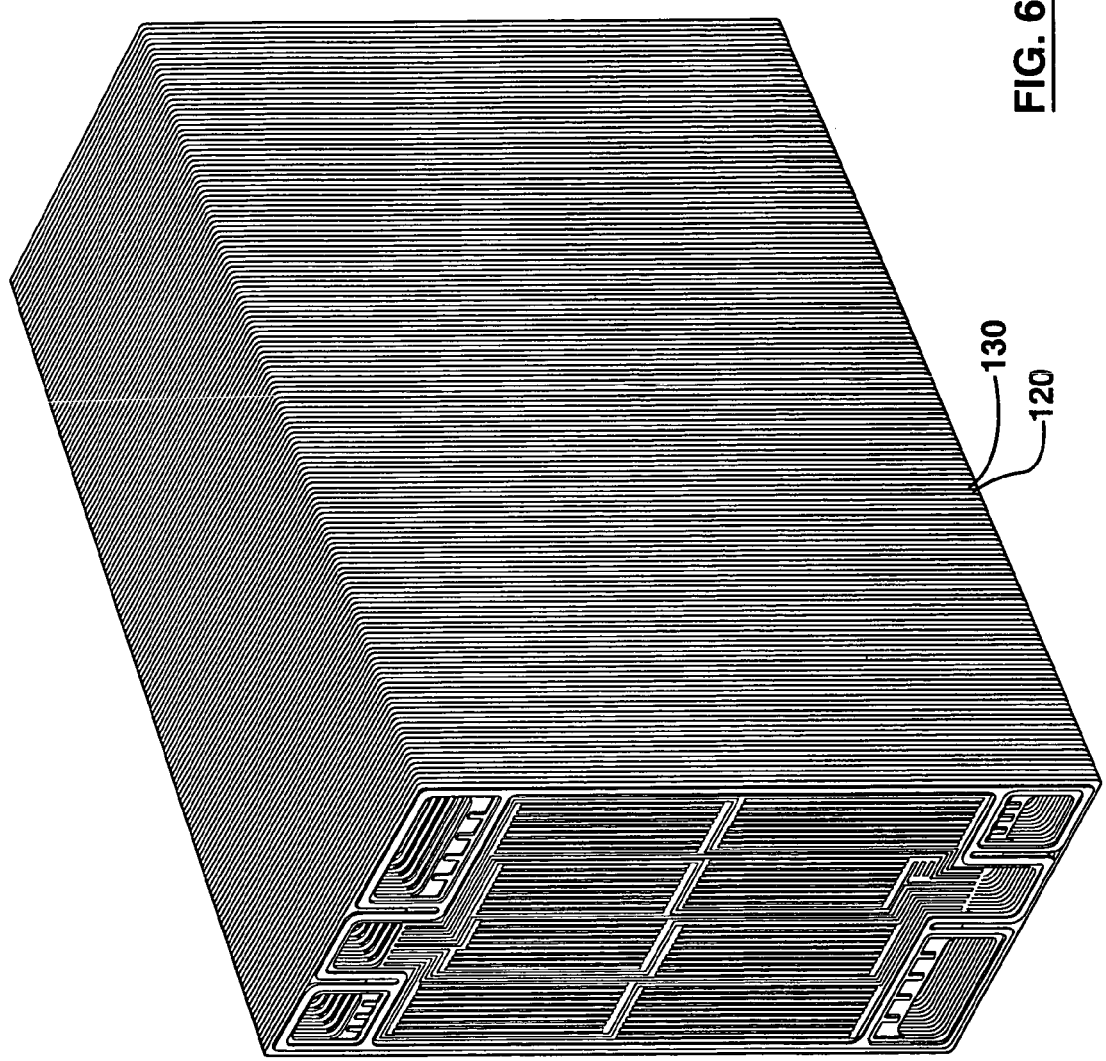

Reference will now be made to FIGS. 6a and 6b, which show configurations with respectively, 20 and 100 individual fuel cells. These Figures. show the fuel cells schematically, and indicate the basic elements of the fuel cells themselves, without the components necessary at the end of the stack. Thus, endplates 102, 104, insulators 112, 114, and current collectors 116, 118 are not shown. Instead, these Figures simply show pairs of flow field plates 120, 130.

In the following description, it is also to be understood that the designations "front" and "rear" with respect to the anode and cathode flow field plates 120, 130, indicates their orientation with respect to the MEA. Thus, "front" indicates the face towards the MEA; "rear" indicates the face away from the MEA. Consequently, in FIGS. 8 and 10, the configuration of the ports is reversed as compared to FIGS. 7 and 9.

Figure 7:
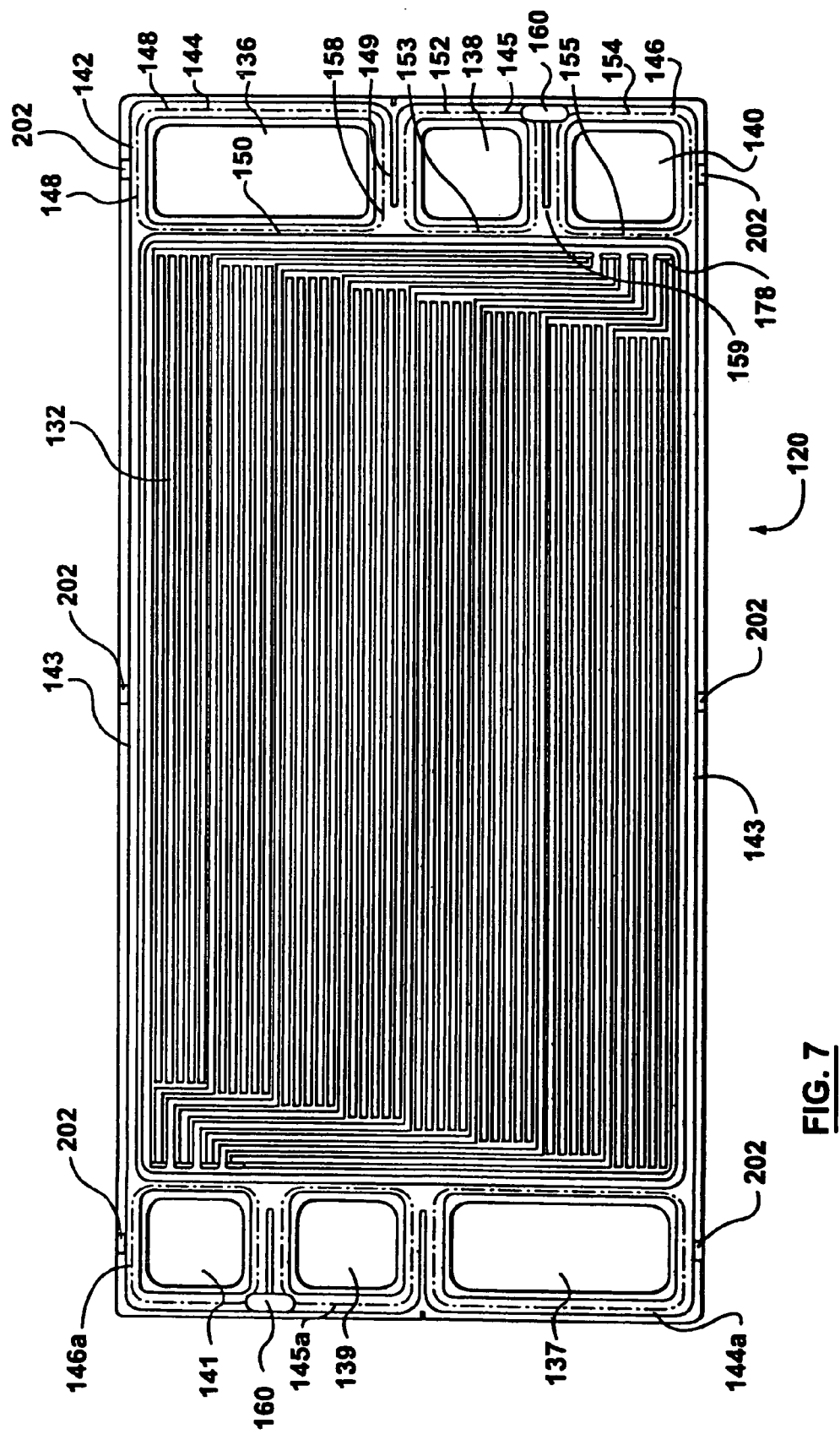
FIGS. 7 and 8 show, respectively, front and rear views of an anode bipolar flow field plate of the fuel cell stack of FIGS. 5 and 6.
Figure 8:
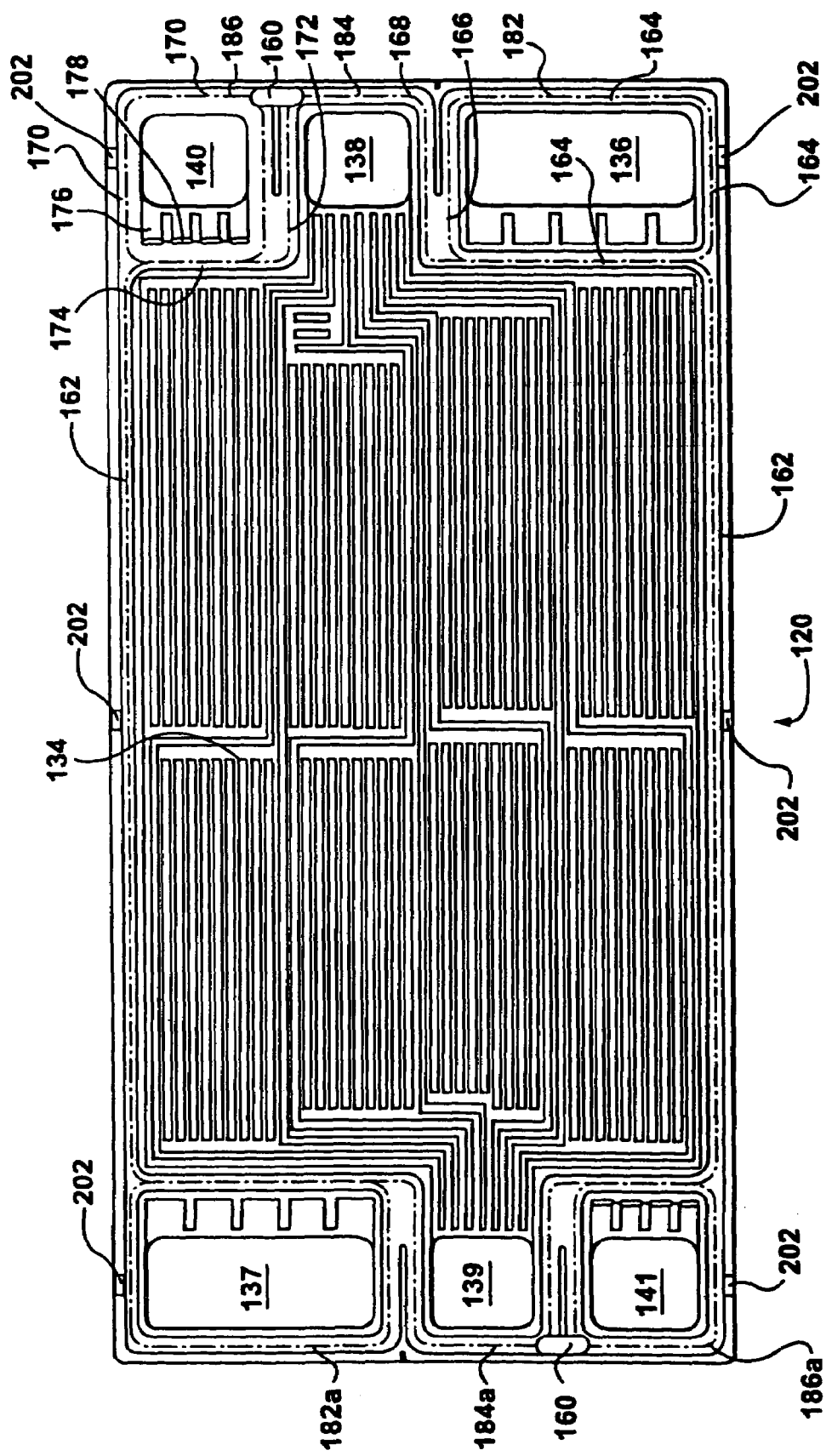

Reference will now be made to FIGS. 7 and 8 which show details of the anode bipolar plate 120. As shown, the plate 120 is generally rectangular, but can be any geometry, and includes a front or inner face 132 shown in FIG. 7 and a rear or outer face 134 shown in FIG. 8. The front face 132 provides channels for the hydrogen, while the rear face 134 provides a channel arrangement to facilitate cooling.

Corresponding to the ports 106–111 of the whole stack assembly, the flow field plate 120 has rectangular apertures 136, 137 for air flow; generally square apertures 138, 139 for coolant flow; and generally square apertures 140, 141 for hydrogen. These apertures 136–141 are aligned with the ports 106–111. Corresponding apertures are provided in all the flow field plates, so as to define ducts or distribution channels extending through the fuel cell stack in known manner.

Now, to seal the various elements of the fuel cell stack 100 together, the flow field plates are provided with grooves to form a groove network, that as detailed below, is configured to accept and to define a flow of a sealant that forms seal through the fuel cell stack. The elements of this groove network on either side of the anode flow field plate 120 will now be described.

On the front face 132, a front groove network or network portion is indicated at 142. The groove network 142 has a depth of 0.024" and the width varies as indicated below.

The groove network 142 includes side grooves 143. These side grooves 143 have a width of 0.153".

At one end, around the apertures 136, 138 and 140, the groove network 142 provides corresponding rectangular groove portions.

Rectangular groove portion 144, for the aperture 136, includes outer groove segments 148, which continue into a groove segment 149, all of which have a width of 0.200". An inner groove segment 150 has a width of 0.120". For the aperture 138 for cooling fluid, a rectangular groove 145 has groove segments 152 provided around three sides, each again having a width of 0.200". For the aperture 140, a rectangular groove 146 has groove segments 154 essentially corresponding with the groove segments 152 and each again has a width of 0.200". For the groove segments 152, 154, there are inner groove segments 153, 155, which like the groove segment 150 have a width of 0.120".

It is to be noted that, between adjacent pairs of apertures 136, 138 and 138, 140, there are groove junction portions 158, 159 having a total width of 0.5", to provide a smooth transition between adjacent groove segments. This configuration of the groove junction portions 158, 159 and the reduced thickness of the groove segments 150, 153, 155, as compared to the outer groove segments, is intended to ensure that the material for the sealant flows through all the groove segments and fills them uniformly.

To provide a connection through the various flow field plates and the like, a connection aperture 160 is provided, which has a width of 0.25", rounded ends with a radius of 0.125" and an overall length of 0.35". As shown, in FIG. 7 connection aperture 160 is dimensioned so as to clearly intercept the groove segments 152, 154. This configuration is also found in the end plates, insulators and current collection plates, as the connection aperture 160 continues through to the end plates and the end plates have a corresponding groove profile. It is seen in greater detail in FIGS. 12 and 15, and is described below.

The rear seal profile of the anode flow field plate is shown in FIG. 8. This includes side grooves 162 with a larger width of 0.200", as compared to the side grooves on the front face. Around the air aperture 136, there are groove segments 164 with a uniform width also of 0.200". These connect into a first groove junction portion 166.

For the coolant aperture 138, groove segments 168, also with a width of 0.200", extend around three sides. As shown, the aperture 138 is open on the inner side to allow cooling fluid to flow through the channel network shown. As indicated, the channel network is such as to promote uniform distribution of cooling flow across the rear of the flow field plate.

For the fuel or hydrogen aperture 140 there are groove segments 170 on three sides. A groove junction portion 172 joins the groove segments around the apertures 138, 140.

An innermost groove segment 174, for the aperture 140 is set in a greater distance, as compared to the groove segment 155. This enables flow channels 176 to be provided extending under the groove segment 155. Transfer slots 178 are then provided enabling flow of gas from one side of the flow field plate to the other. As shown in FIG. 7, these slots emerge on the front side of the flow field plate, and a channel network is provided to distribute the gas flow evenly across the front side of the plate. The complete rectangular grooves around the apertures 136, 138 and 140 in FIG. 8 are designated 182, 184 and 186 respectively.

As shown in FIGS. 7 and 8, the configuration for the apertures 137, 139 and 141 at the other end of the anode flow field plate 120 corresponds. For simplicity and brevity the description of these channels is not repeated. The same reference numerals are used to denote the various groove segments, junction portions and the like, but with a suffix "a" to distinguish them, e.g. for the groove portions 144a, 145a and 146a, in FIG. 7.

Figure 9:
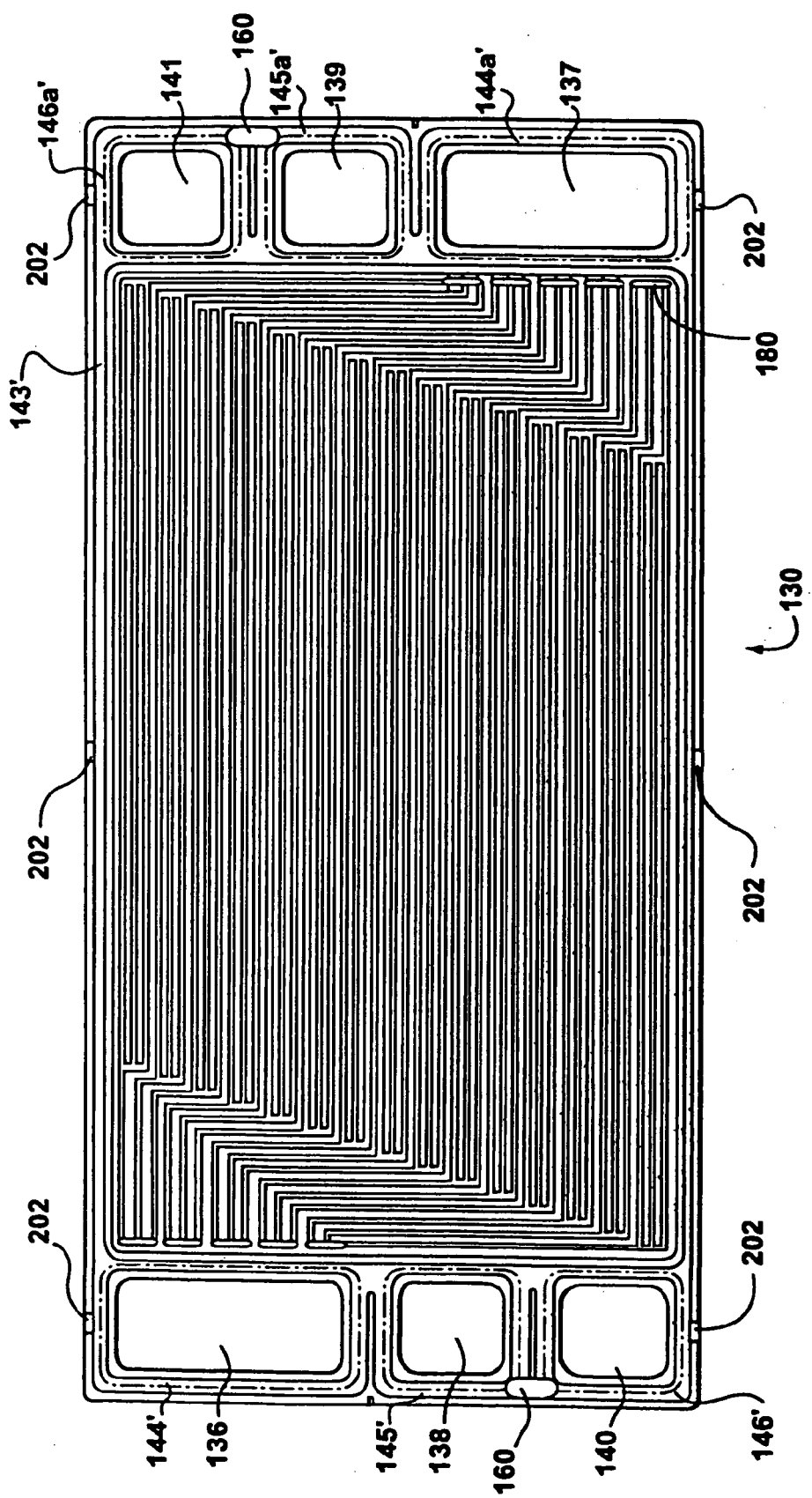
FIGS. 9 and 10 show, respectively, front and rear views of a cathode bipolar flow field plate of the fuel cell stack of FIGS. 5 and 6.
Figure 10:
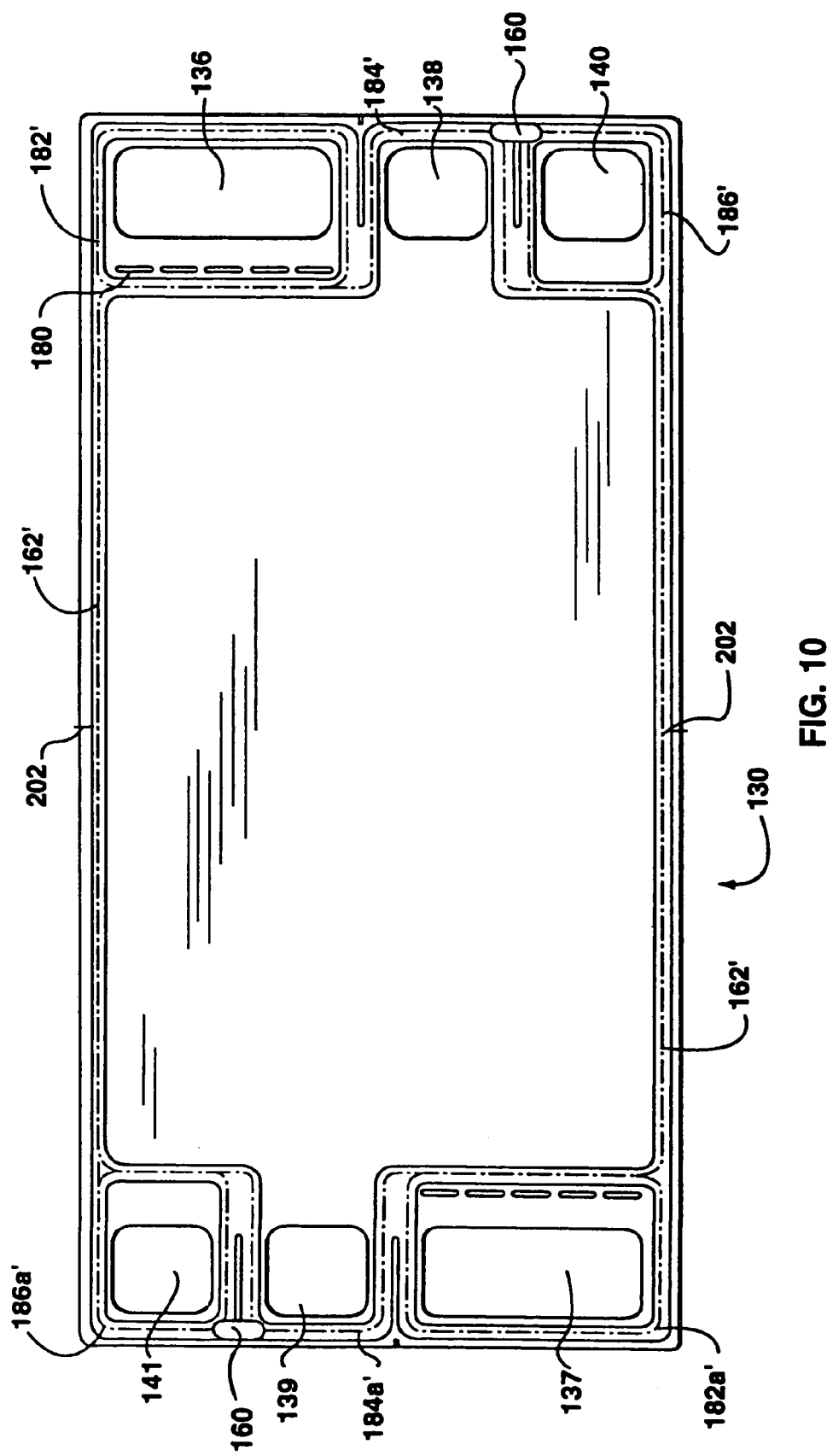

Reference is now being made to FIGS. 9 and 10, which show the configuration of the cathode flow field plate 130. It is first to be noted that the arrangement of sealing grooves essentially corresponds to that for the anode flow field plate 120. This is necessary, since the design required the MEA 124 to be sandwiched between the two flow field plates, with the seals being formed exactly opposite one another. It is usually preferred to design the stack assembly so that the seals are opposite one another, but this is not essential. It is also to be appreciated that the front side seal path (grooves) of the anode and cathode flow field plates 120, 130 are mirror images of one another, as are their rear faces. Accordingly, again for simplicity and brevity, the same reference numerals are used in FIGS. 9 and 10 to denote the different groove segments of the sealing channel assembly, but with an apostrophe to indicate their usage on the cathode flow field plate.

Necessarily, for the cathode flow field plate 130, the groove pattern on the front face is provided to give uniform distribution of the oxidant flow from the oxidant apertures 136, 137. On the rear side of the cathode flow field plate transfer slots 180 are provided, providing a connection between the apertures 136, 137 for the oxidant and the network channels on the front side of the plate. Here, five slots are provided for each aperture, as compared to four for the anode flow field plate. In this case, as is common for fuel cells, air is used for the oxidant, and as approximately 80% of air comprises nitrogen, a greater flow of gas has to be provided, to ensure adequate supply of oxidant.

On the rear of the cathode flow field plate 130, no channels are provided for cooling water flow, and the rear surface is entirely flat. Different depths are used to compensate for the different lengths of the flow channels and different fluids within. However, the depths and widths of the seals will need to be optimized for each stack design. Reference will now be made to FIGS. 11 through 15, which show details of the anode and cathode end plates. These end plates have groove networks corresponding to those of the flow field plates.

Thus, for the anode end plate 102, there is a groove network 190, that corresponds to the groove network on the rear face of the anode flow field plate 120. Accordingly, similar reference numerals are used to designate the different groove segments of the anode and cathode end plates 102, 104 shown in detail in FIGS. 11–13 and 14–15, but identified by the suffix "e". As indicated at 192, threaded bores are provided for receiving the tie rods 131.

Figure 13:
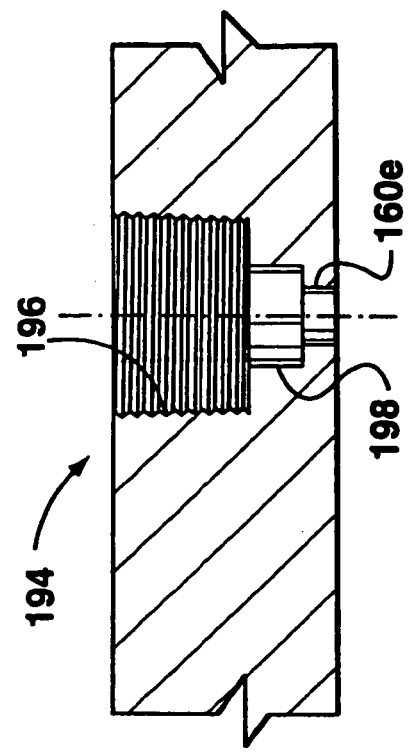
FIG. 13 shows a cross-sectional view along the lines 13 of FIG. 12.

Now, in accordance to the present invention, a connection port 194 is provided, as best shown in FIG. 13. The connection port 194 comprises a threaded outer portion 196, which is drilled and tapped in known manner. This continues into a short portion 198 of smaller diameter, which in turn connects with the connection aperture 160*e*. However, any fluid connector can be used.

Figure 12:
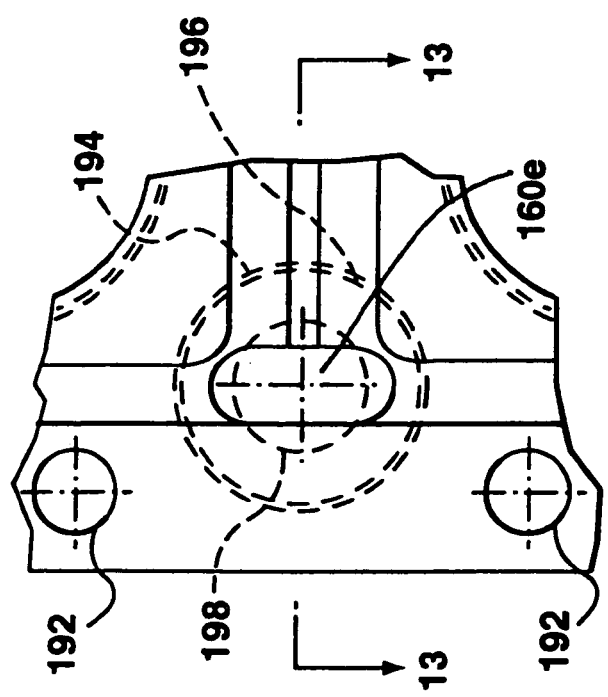
FIG. 12 shows a view, on a larger scale, of a detail 12 of FIG. 11.

Corresponding to the flow field plates, for the anode end plate 102, there are two connection ports 194, connecting to the connection apertures 160*e* and 160*ae*, as best shown in FIGS. 12 and 13.

Figure 14:
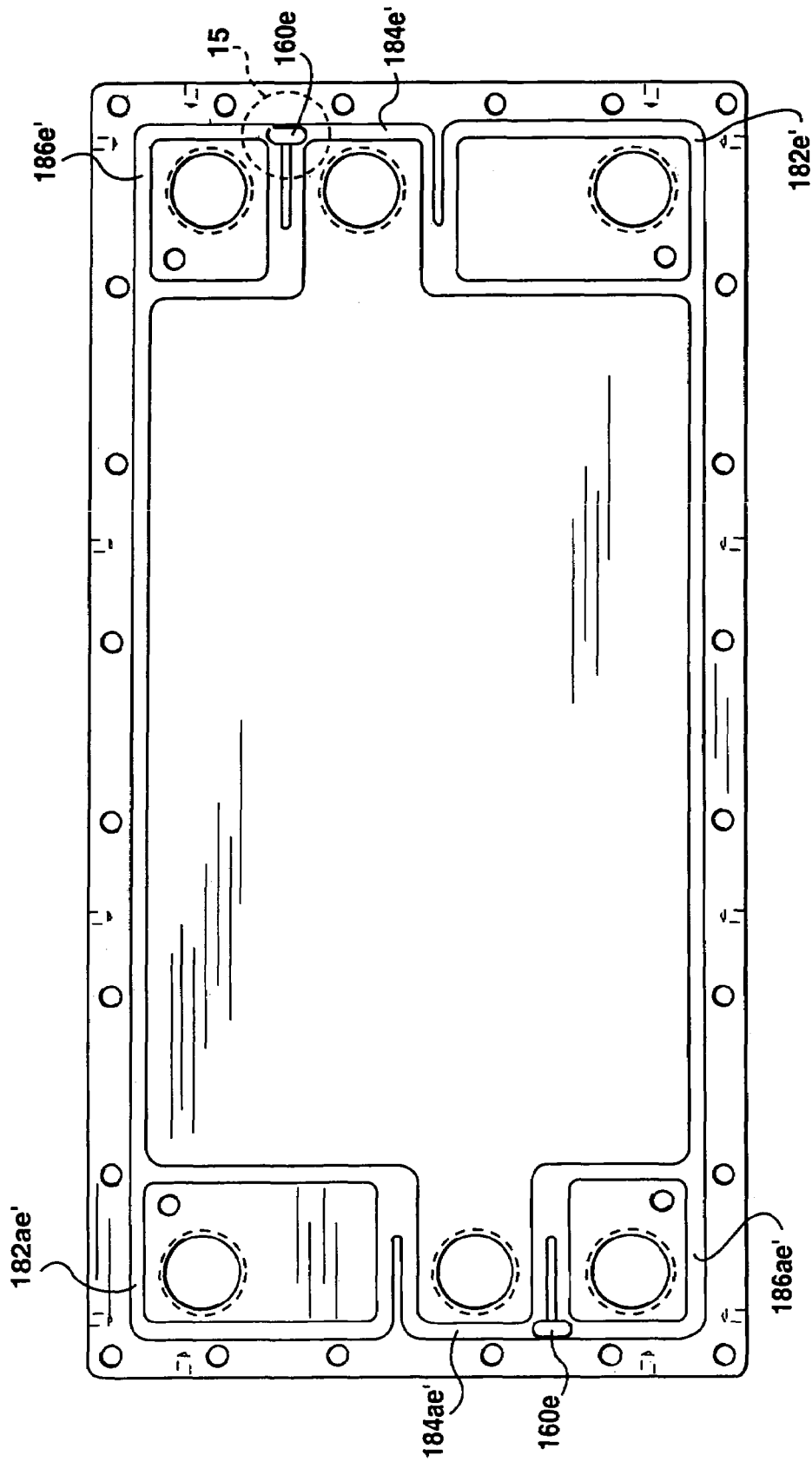
FIG. 14 shows a rear view of a cathode end plate.
Figure 15:
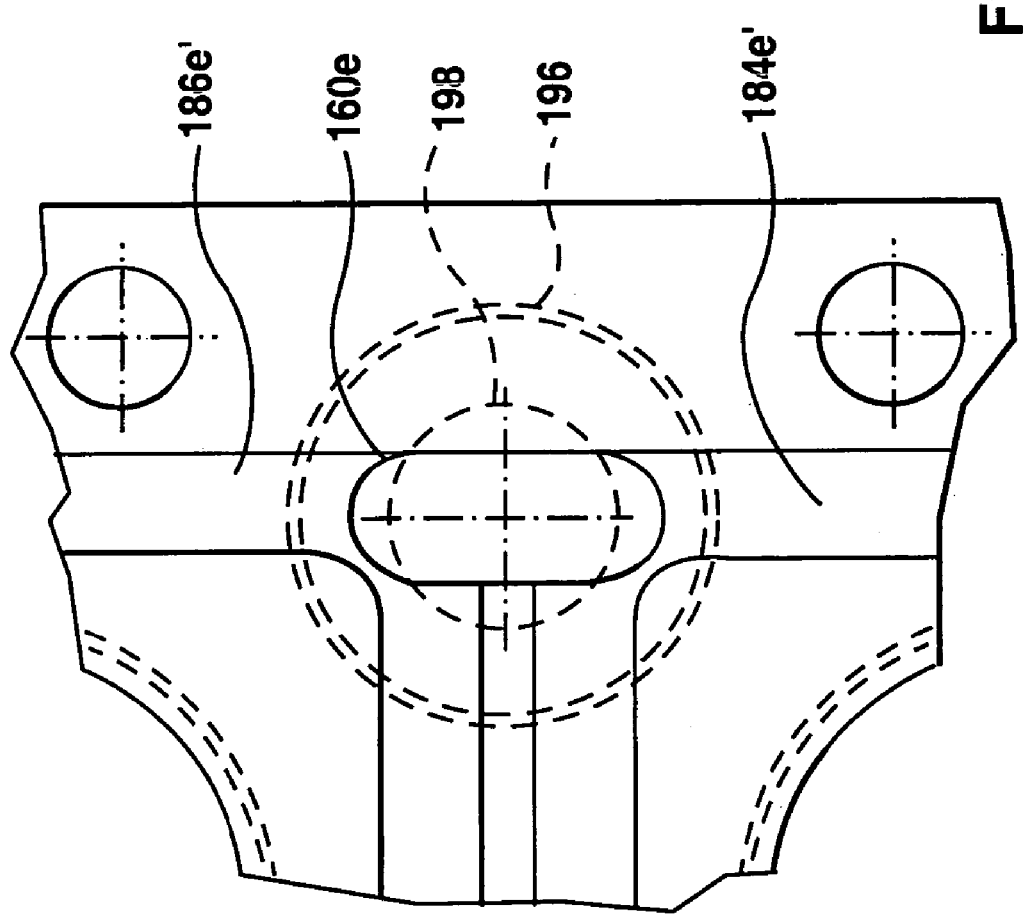
FIG. 15 shows a view, on a larger scale, of a detail 15 of FIG. 14.

Correspondingly, the cathode end plate is shown in detail in FIGS. 14 and 15, with FIG. 15, as FIG. 12, showing connection through to the groove segments. The groove profile on the inner face of the cathode end plate corresponds to the groove profile of the anode flow field plate. As detailed below, in use, this arrangement enables a seal material to be supplied to fill the various seal grooves and channels. Once the seal has been formed, then the supply conduits for the seal material are removed, and closure plugs are inserted, such closure plugs being indicated at 200 in FIG. 5.

Now, unlike conventional gaskets, the seals for the fuel cells of he present invention are formed by injecting liquid silicone rubber material into the various grooves between the different elements of the fuel stack. As these grooves are closed, this necessarily requires air present in these channels to be exhausted. Otherwise, air pockets will be left, giving imperfections in the seal. For this purpose, it has been found sufficient to provide very small channels or grooves simply by scratching the surface of the plates at appropriate locations. The locations for these scratches can be determined by experiment or by calculation.

In use, the fuel cell stack 100 is assembled with the appropriate number of fuel cells and clamped together using the tie rods 131. The stack would then contain the elements listed above for FIG. 5, and it can be noted that, compared to conventional fuel cell stacks, there are, at this stage, no seals between any of the elements. However insulating material is present to shield the anode and cathode plates touching the MEA (to prevent shorting) and is provided as part of the MEA. This material can be either part of the Ionomer itself or some suitable material (fluoropolymer, mylar, etc.) An alternative is that the bipolar plate is non-conductive in these areas.

The ports provided by the threaded bores 196 are then connected to a supply of a liquid silicone elastomeric seal material. Since there are two ports or bores 196 for each end plate, i.e. a total of four ports, this means that the seal material is simultaneously supplied from both the anode and the cathode ends of the stack; it is, additionally, supplied from both ends or edges of each of the cathode and the anode. It is possible, however, to supply from any number of ports and this is dictated by the design.

A suitable seal material is then injected under a suitable pressure. The pressure is chosen depending upon the viscosity of the material, the chosen values for the grooves, ducts and channels, etc., so as to ensure adequate filling of all the grooves and channels in a desired time.

Material flows from the inner ports provided by the threaded bores 196 through the connection apertures 160 to each individual fuel cell. Within these individual fuel cells, it then flows through the groove networks detailed above. This is described, by way of example, in relation to just the groove profile of the anode flow field plate 120. It will be understood that as the groove networks are generally similar, similar flow patterns will be realized for the other groove networks.

It will be appreciated that the two ends of the front face of the anode flow field plate 120 exhibit rotational symmetry, although this is merely convenient and is not essential. Thus, the flow patterns will generally be similar. Again, for simplicity, this will be described for the right hand end of the groove network 142, as seen in FIG. 7, and it will be understood that a corresponding flow pattern takes place for the left hand end.

The seal material flows out of the connection aperture 160 into the groove segments 152, 154. The materials simultaneously flow along the outer edges of these segments and also the portions of these segments directed inwardly towards the groove junction portion 159. When the material reaches the junction portion 159 it will then be diverted into the narrower groove segments 153, 155. Simultaneously, the material continues to flow around the outside of the apertures 138, 140 through the groove segments 152, 154.

The two flows around the aperture 140 will eventually lead into the side groove 143. It will be appreciated that the dimensions of the grooves 154, 155 and the location of the connection aperture 160 are chosen such that the two flows will meet approximately simultaneously, and in particular, that no air pocket will be left.

Correspondingly, the flows around the aperture 138 will meet at the groove junction portion 158. Again, the dimensions of the groove segments 152, 153 and also the groove junction portion 159 are sized to ensure that these flows meet approximately simultaneously. The flow then diverges again and flows in two paths around the larger aperture 136 for the oxidant flow. Note that again the groove segment 148 has a larger width than the groove segment 150 to promote approximately equal travel time around the aperture 136, so that the two flows arrive generally simultaneously at a junction with the topmost groove 143 in FIG. 7. The flows then combine to pass down the side groove 143.

As noted, a generally similar action is taking place at the other, left hand end of the anode flow field plate 120, as viewed in FIG. 7. Consequently, for each side groove 143, there are then two flows approaching from either end. These two flows will meet at the vents 202. These vents are dimensioned so as to permit excess air to be vented to the exterior, but small enough to allow fill pressures to build up to a level that allows all of the groove segments in the assembly to fill completely. The design of the groove segment patterns allow for multiple uncured seal material fronts to advance simultaneously during the filling operation. When one flow front meets another flow front, air can potentially be trapped, and the internal air pressure may prevent the groove segments from filling completely with seal material. To prevent this from happening, the vents 202 are placed where seal material flow fronts converge. Typically these vents are 0.5 to 3.0 mm wide and 0.0003" (0.0075 mm) to 0.002" (0.05 mm) deep with many alternate configurations known to work, such as round vents, circular grooves as a result of regular grinding marks, and crosshatched patterns. Location of the vents is a critical parameter in the filling function and these are typically located using a combination of computer simulation and empirical design. As shown, additional vents 202 can be provided at either end, to give a total of six vents on the face of the plate.

Figure 11:
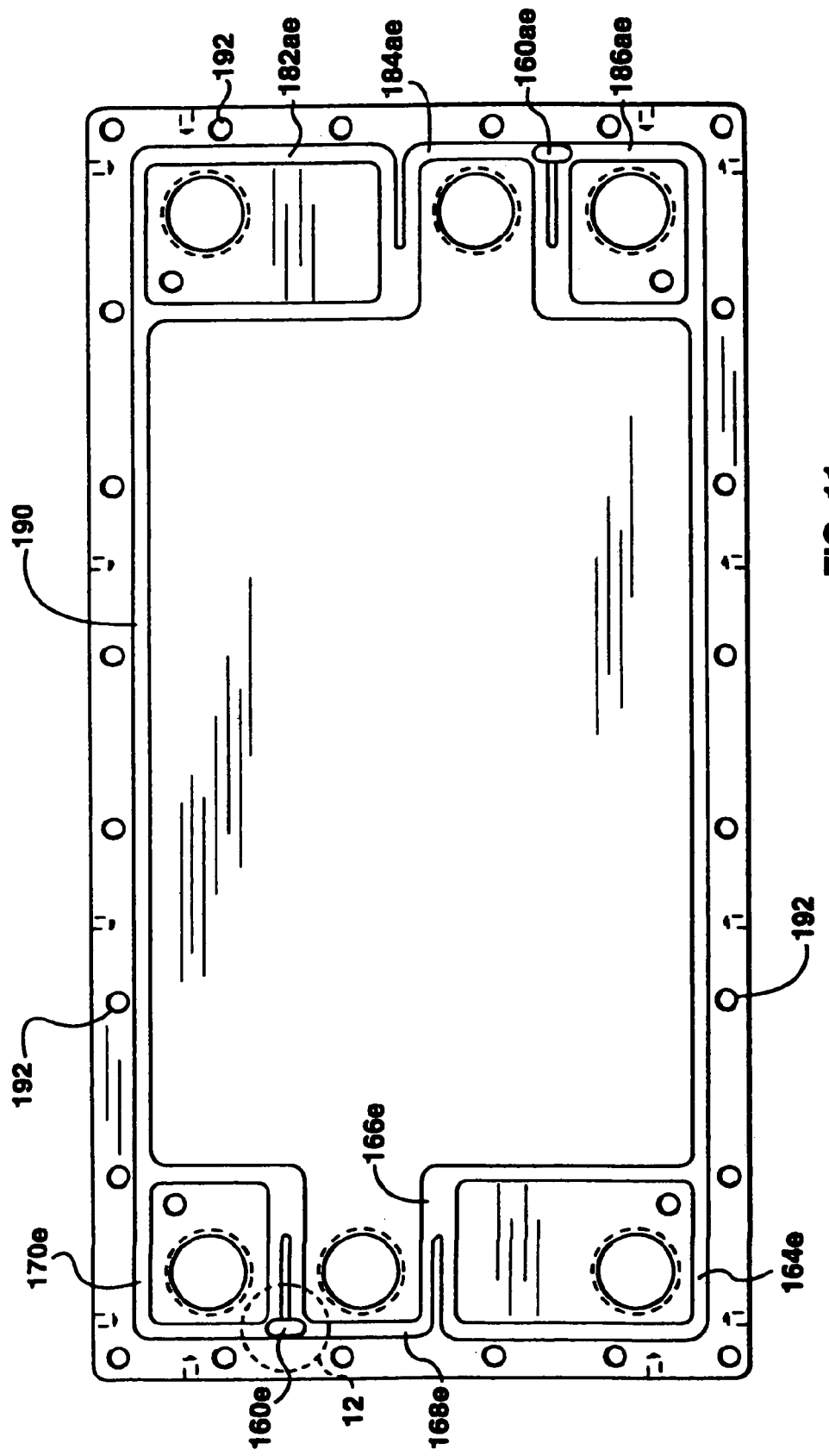
FIG. 11 shows a rear view of an anode end plate.

These vents 202 can be provided for the front and back faces of both the anode and cathode flow field plates. It will be understood that for facing surfaces of the plated, it will often be sufficient to provide vent grooves on the face of one plate. Also, as shown in FIG. 11, vents 202 are also provided on the end plates, at corresponding locations.

In practice, for any particular fuel stack assembly, tests will be run to establish the filling time required to ensure complete filling of all grooves and channels. This can be done for different materials, dimensions, temperatures etc. With the filling time established, material is then injected into the complete stack assembly 100, for the determined filling time, following which the flow is terminated, and the seal material supply is detached.

The connection ports 194 are then closed with the plugs 200. The entire fuel stack assembly 100 is then subjected to a curing operation. Typically this requires subjecting it to an elevated temperature for a set period of time. The seal material is then chosen to ensure that it cures under these conditions.

Following curing, the fuel cell stack 100 would then be subjected to a battery of tests, to check for desired electrical and fluid properties, and in particular to check for absence of leaks of any of the fluids flowing through it.

If any leaks are detected, the fuel cell will most likely have to be repaired. Depending on the nature of the leak and details of an individual stack design, it may be possible simply to separate the whole assembly at one seal, clear out the defective seal and then form a new seal. For this reason it may prove desirable to manufacture relatively small fuel cells stacks, as compared to other conventional practice. While this may require more inter-stack connections, it will be more than made up for by the inherent robustness and reliability of each individual fuel cell stack. The concept can be applied all the way down to a single cell unit (identified as a Membrane Electrode Unit or MEU) and this would then conceivably allow for stacks of any length to be manufactured.

This MEU is preferably formed so that a number of such MEU's can be readily and simply clamped together to form a complete fuel cell stack of desired capacity. Thus, an MEU would simply have two flow field plates, whose outer or rear faces are adapted to mate with corresponding faces of other MEU's, to provide the necessary functionality. Typically, faces of the MEU are adapted to form a coolant chamber for cooling fuel cells. One outer face of the MEU can have a seal or gasket preformed with it. The other face could then be planar, or could be grooved to receive the preform seal on the other MEU. This outer seal or gasket is preferably formed simultaneously with the formation of the internal seal, injected-in-place in accordance with the present invention. For this purpose, a mold half can be brought up against the outer face of the MEU, and seal material can then be injected into a seal profile defined between the mold half and that outer face of the MEU, at the same time as the seal material is injected into the groove network within the MEU itself. To form a complete fuel cell assembly, it is simply a matter of selecting the desired number of MEU's, clamping the MEU's together between endplates, with usual additional end components, e.g. insulators, current collectors, etc. The outer faces of the MEU's and the preformed seals will form necessary additional chambers, especially chambers for coolant, which will be connected to appropriate coolant ports and channels within the entire assembly. This will enable a wide variety of fuel cell stacks to be configured from a single basic unit, identified as an MEU. It is noted, the MEU could have just a single cell, or could be a very small number of fuel cells, e.g. 5. In the completed fuel cell stack, replacing a failed MEU, is simple. Reassembly only requires ensuring that proper seals are formed between adjacent MEU's and seals within each MEU are not disrupted by this procedure.

The embodiments described have groove networks that include groove segments in elements or components on either side of the groove. It will be appreciated that this is not always necessary. Thus, for some purposes, e.g. for defining a chamber for coolant, it may be sufficient to provide the groove segments in one flow plate with a mating surface being planar, so that tolerances are less critical. The invention has also been described as showing the MEA extending to the edges of the flow field plates. Two principal variants are to be noted. Firstly, the material of the MEA is expensive and necessarily must be quite thin typically of the order of one to two thousands of an inch with current materials, so that it is not that robust. For some applications, it will be preferable to provide a peripheral flange or mounting layer bonded together and overlapping the periphery of the PEM itself. Typically the flange will then be formed from two layers each one to two thousands of an inch thick, for a total thickness of two to four thousands of an inch. It is this flange or layer which will then be sealed with the seal.

A second consideration is that providing the MEA, or a flange layer, bisecting a groove or channel for the seal material may give problems. It is assumed that flow of the seal material is uniform. This may not occur in practice. For example, if the MEA distorts slightly, then flow cross-sections on either side will distort. This will lead to distortions in flow rates of the seal material on the two sides of the MEA, which will only cause the distortion to increase. Thus, this will increase the flow on the side already experiencing greater flow, and restrict it on the other side. This can result in improper sealing of the MEA. To avoid this, the invention also anticipates variants, shown in FIGS. 1*b*–1*e*. These are described below, and for simplicity like components in these figures are given the same reference numerals as in FIG. 1*a*, but with the suffixes b, c, d as appropriate, to indicate features that are different.

Figure 1B:
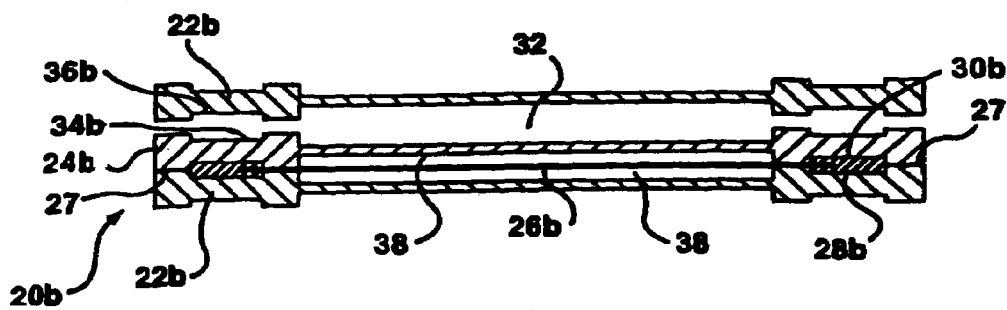
FIG. 1b–1e show variant seal arrangements for use in the embodiment of FIG. 1, and other embodiments, of the present invention.

A first variant, in FIG. 1*b*, provides a configuration in which the periphery of the MEA 26*b*, or any mounting flange, is dimensioned to terminate at the edge of the groove itself, i.e. the MEA 26*b* would not extend all the way across the groove. This will require more precise mounting of the MEA 26*b*. Additionally, it would mean that mating surfaces of endplates and the like, outside of the groove network would not then be separated by the MEA. To obtain insulation between the flow field plates, a separate layer of insulation, indicated at 27 would be provided, for example, by screen printing this onto the surface of flow field plates 22b and 24b. As shown, the grooves 28b, 30b can be largely unchanged.

Figure 1C:
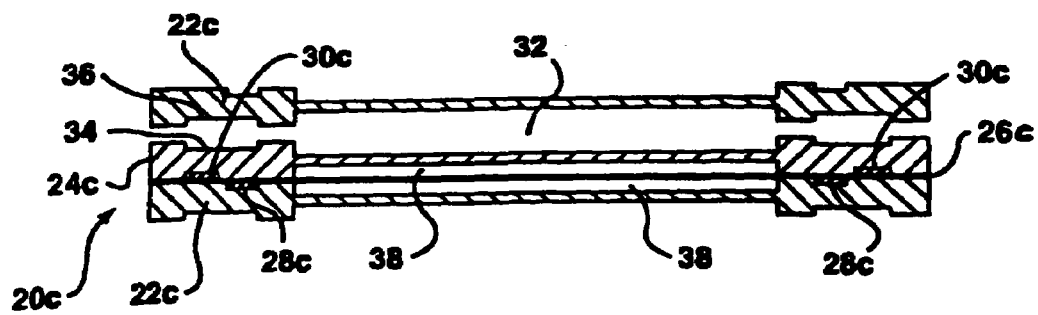

A second variant, in FIG. 1c, overcomes the potential problem of different flow rates in opposed grooves causing distortion of the MEA, by providing offset grooves, shown at 28c, 30c. In this arrangement, each groove 28c in the plate 22c would be closed by a portion of the MEA 26c, but the other side of that portion of the MEA 26c would be supported by the second plate 24c, so as to be incapable of distortion. Correspondingly, a groove 30c in the second plate 24c, offset from the groove 28c in the plate 22c, would be closed by MEA 26c, and the MEA 26c would be backed and supported by the plate 22c.

Figure 1D:
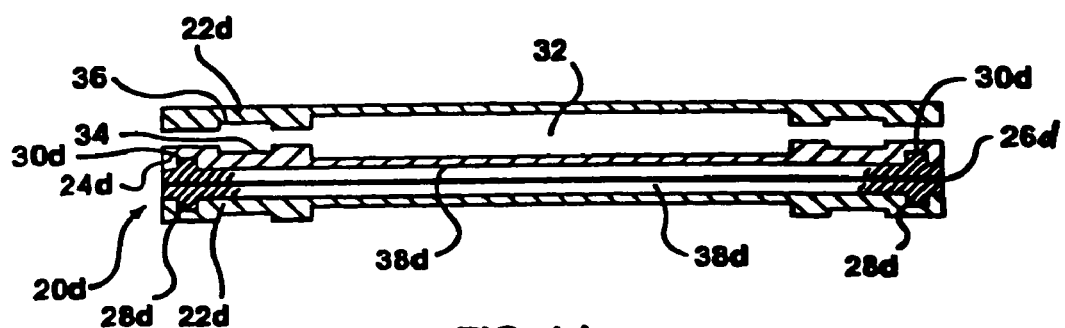

Referring to FIG. 1d, in a further variant, the GDM cavities 38 are effectively removed, by providing GDM layers that extend to the peripheries of the plates 22d and 24d. The grooves 28d, 30d are still provided as shown, opening onto edges of the GDM layers. The seal then flows out of the grooves 28d, 30d, to fill the voids in the GDM, until the seal material reaches the surface of the MEA 26d. It is expected that the seal material will flow around individual particles of the catalyst layer, so as to form a seal to the actual proton exchange membrane, even if the seal material does not fully penetrate the catalyst layer. As required, the MEA 26d layer can terminate either flush with the peripheries of the plates 22d, 24d, or set in from the plate peripheries; in the later case, a seal, itself flush with the plate peripheries, will effectively be formed around the outer edges of the MEA 26d and the GDM layers. In either case, it is possible to provide an extension of the seal, outside of the grooves 28d, 30d and beyond the plate peripheries, possibly extending around the fuel cell stack as a whole.

Figure 1E:
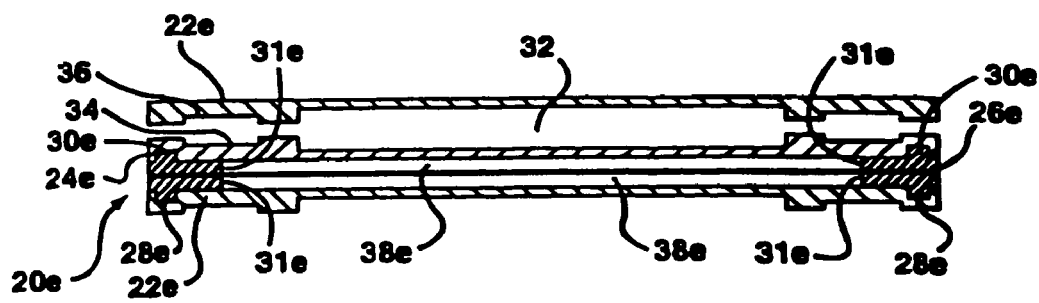

In FIG. 1e, the construction is similar to FIG. 1d. However, the GDM layers terminate short of the plate peripheries as indicated at 31e. the grooves 28e, 30e are then effectively formed outside of the GDM layers to the peripheries of the plates 22e, 24e.

In FIGS. 1d and 1e, the anode and cathode flow field plates have flat, opposing faces, although it will be understood that these faces, in known manner, would include flow channels for gases. As these faces are otherwise flat, this greatly eases tolerance and alignment concerns, and in general it is expected that the MEA 26d,e can be inserted without requiring any tight tolerances to be maintained.

In all of FIGS. 1a–1e, the PEM layer 26a–e can be replaced with a PEM layer that has an outer mounting flange or border. This usually makes the PEM layer stronger and saves on the more expensive PEM material. This has advantages that the flange material can be selected to form a good bond with the seal material, and this avoids any potential problems of forming a seal involving the catalyst layers.

In FIGS. 1d and 1e, facing projections can be provided around the outer peripheries of the plates to control spacing of the plates and hence pressure on the GDM layers without affecting flow of the seal material. These can additionally assist in aligning the PEM layers 26 and the GDM layers. Alternatively, projections can be omitted, and the entire stack clamped to a known pressure prior to sealing. Unlike known techniques, all the pressure is taken by the GDM layers, so that each GDM layer is subject to the same pressure. This pressure is preferably set and maintained by tie rods or the like, before injecting the seal material.

Figure 16A:
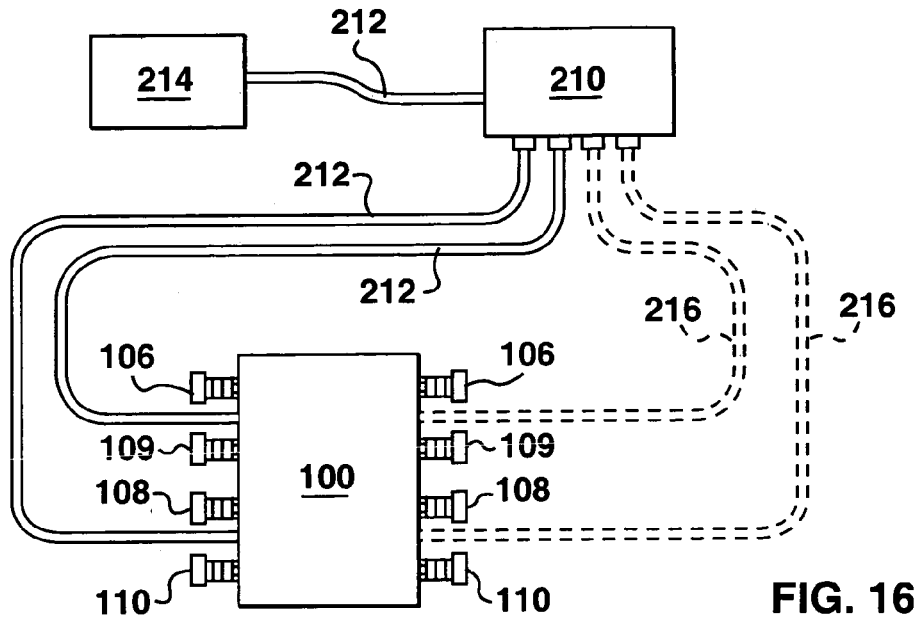
FIGS. 16a and 16b show schematically different configurations for pumping elastomeric sealing material into a fuel cell stack.
Figure 16B:
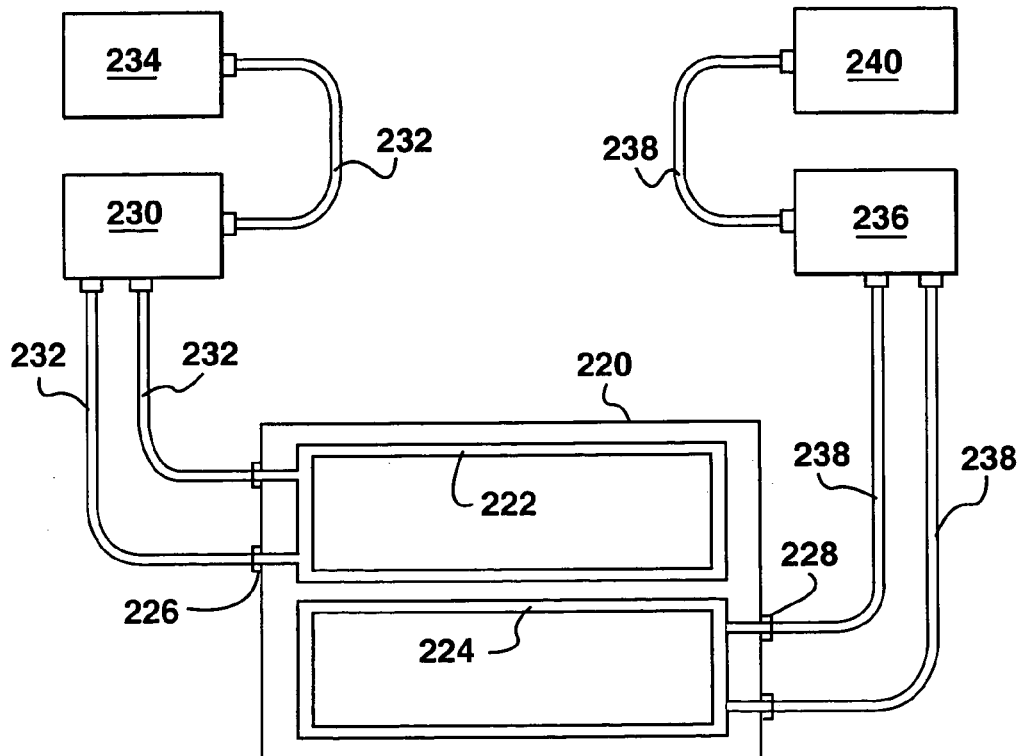
Figure 21:
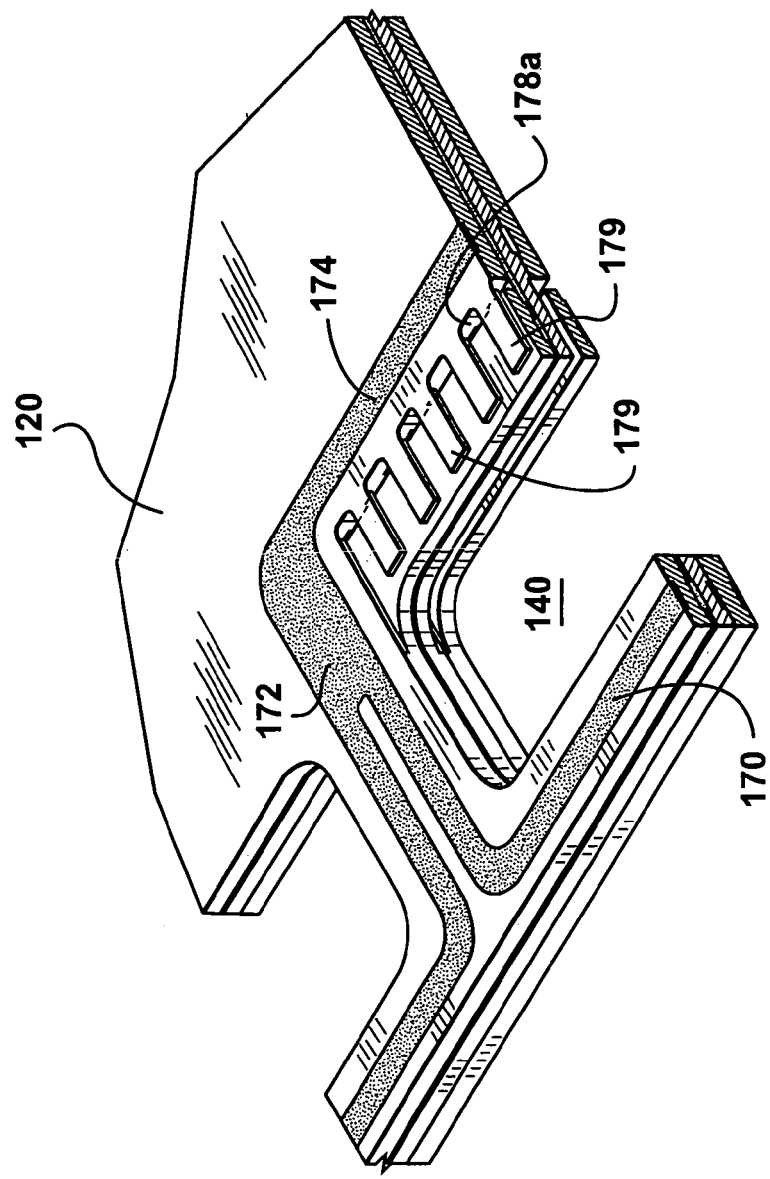
FIG. 21 is a perspective, cut-away view showing details at the end of one of the plates, showing the variant plates.
Figure 20:
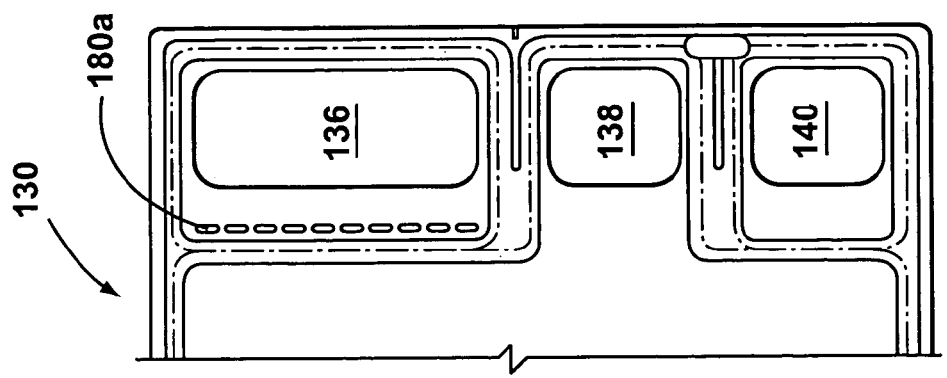
FIG. 20 shows a variant of one end of the rear face of the cathode bipolar flow field plate, the other end corresponding.

Referring now to FIGS. 16a and 16b, there is shown schematically the overall arrangement for supplying the seal material with FIG. 16b showing an arrangement for supplying two different seal materials.

In FIG. 16a, the fuel cell stack 100 of FIG. 5 is shown. A pump 210 is connected by hoses 212 to two ports at one end of the fuel cell stack 100. An additional hose 212 connects the pump 210 to a silicone seal material dispensing machine, that includes a static mixer, and which is indicated at 214.

In this arrangement, the seal material is supplied to just from one end of the stack 100. As such, it may take some time to reach the far end of the stack, and this may not be suitable for larger stacks. For larger stacks, as indicated in dotted lines 216, additional hoses can be provided, so that the seal material is supplied from both ends of the stack 100. As detailed elsewhere, the material is supplied at a desired pressure, until the stack is filled, and all the air has been displaced from the stack. Typically, this timing will be determined by experimentation and testing, e.g. by filling stacks and then dismantling them to determine the level of filling. Commonly, this will give a minimum fill time required to ensure displacement of all air from the stack, and it also enables checking that appropriate vent locations have been provided.

Once the stack has been filled, the hoses 212, and 216 if present, are disconnected. Preferably, closure plugs, such as those indicated at 200, as shown in FIG. 5, are used to close the stack, although this may not always be necessary. For example, where a fuel cell stack is filled from one side, it may be sufficient to orient the fuel cell stack so the connection ports are at the top and open upwards, so that no closure is required. Indeed, for some designs and choices of materials, this may be desirable, since it will ensure that the seal material is at atmospheric pressure during the curing process.

The fuel cell stack is then subject to a curing operation. This can be achieved in a number of ways. For curing at elevated temperatures other than ambient temperature, the stack can be connected to a source of heated water, which will be passed through the coolant chambers of the stack. Commonly, it will be preferred to pass this water through at a low pressure, since, at this time, cured seals will not have been formed. Alternatively, or as well, the whole stack can be placed in a curing chamber and subject to an elevated temperature to cure the seal material.

Referring to FIG. 16b, this shows an alternative fuel cell stack indicated at 220. This fuel cell stack 220 has two separate groove networks indicated, schematically at 222 and 224. The groove network 222 is connected to ports 226 at one end, while the groove network 224 is connected to ports 228 at the other end. The intention here is that each groove network would be supplied with a separate sealing material, and that each sealing material would come into contact with different elements of the fuel cell stack. This enables the sealing materials to be tailored to the different components of the fuel cell stack, rather than requiring one sealing material to be compatible with all materials of the stack.

For the first groove network 222, there is a pump 230 connected by hoses 232 to a fuel cell stack 220. One hose 232 also connects the pump 230 to a dispensing machine 234. Correspondingly, for the second groove network 224, there is a pump 236 connected by hoses 238 to the stack 220, with a hose 238 also connecting a second dispensing machine 240 to the pump 236.

In use, this enables each groove network 222, 224 to be filled separately. This enables different pressures, filling times and the like selected for each groove network. For reasons of speed of manufacture, it is desirable that the filling times be compatible, and this may necessitate different pressures being used, depending upon the different seal materials.

It is also possible that different curing regimes could be provided. For example, one groove network can be filled first and cured at an elevated temperature that would damage the second seal material. Then, the second groove network is filled with the second seal material and cured at a different, lower temperature. However, in general, it will be preferred to fill and cure the two separate groove networks 222, 224 simultaneously, for reasons of speed of manufacture.

While separate pumps and dispensing machines are shown, it will be appreciated that these components could be integral with one another.

While the invention is described in relation to proton exchange membrane (PEM) fuel cell, it is to be appreciated that the invention has general applicability to any type of fuel cell. Thus, the invention could be applied to: fuel cells with alkali electrolytes; fuel cells with phosphoric acid electrolyte; high temperature fuel cells, e.g. fuel cells with a membrane similar to a proton exchange membrane but adapted to operate at around 200° C.; electrolysers, regenerative fuel cells and (other electrochemical cells as well.) The concept would also be used with higher temperature fuel cells, namely molten carbonate and solid oxide fuels but only if suitable seal materials are available.

FIGS. 17, 18, 19 and 20 show alternative rib configurations for the plates. Here, the number of ribs adjacent the apertures for the fuel and oxygen flows, to provide a "backside" feed function, have essentially been approximately doubled. This provides greater support to the groove segment on the other side of the plate.

In these FIGS. 17–20, the transfer slots are denoted by the references 178a, for the anode plate 120, and 180a, for the cathode plate 130. The suffixes indicate that the transfer slots have different dimensions and more numerous. There are eight transfer slots 178a, as compared to four slots 178, and there are either eight (FIG. 19) or ten (FIG. 20) transfer slots 180a, as compared to five slots 180. It will also be understood that it is not necessary to provide discrete slots and that, for each flow, it is possible to provide a single relatively large transfer slot. Each of the slots 178a communicates with a single flow channel (FIG. 17), and each fo the slots 180a communicates with two flow channels, except for an end slot 180a that communicates with a single channel (FIG. 19).

The transfer slots 178a are separated by ribs 179, and these are now more numerous than in the first embodiment or variant. Here, the additional ribs 179 provide additional support to the inner groove segment on the front face of the anode plate (FIG. 17, 18). Similarly, the is now a larger number of ribs, here designate at 181, between the slots 180a, and these provide improved support for the groove segment 150 (FIGS. 17, 18).

It will also be understood that, as explained above, facing rear faces of the anode and cathode plates abut to form a compartment for coolant. Consequently, the ribs 179 and 181 abut and support the cathode plate to provide support for the inner groove segments around the apertures 137 and 141 of the cathode plate 130 (FIG. 18).

Another aspect of the invention relates to the detailed composition of the elastomeric seal material, which is an organo siloxane composition curable to an elastomeric material and having a pumpable viscosity in the uncured state, allowing it to be cured in situ in a fuel cell cavity to provide seals in distinct zones as detailed above. The composition of the seal material, in this preferred embodiment, comprises:

(a) 100 parts by weight of polydiorganosiloxane containing 2 or more silicon-atom-bonded alkenyl groups in each molecule;

(b) 5 to 50 parts by weight of reinforcing filler;

(c) 1–20 parts by weight of an oxide or hydroxide of an alkaline-earth metal with an atomic weight of 40 or greater;

(d) an organohydrogensiloxane containing 3 or more silicon-atom-bonded hydrogen atoms in each molecule, in an amount providing a molar ratio of the silicon-atom-bonded hydrogen atoms in this ingredient to the silicon-atom-bonded alkenyl groups in ingredient (A) in a range of 0.4:1 to 5:1;

(e) a platinum-type metal catalyst in an amount providing 0.1 to 500 parts by weight of platinum-type metal per 1 million parts by weight of ingredient (a);

(f) optionally, 0.1–5.0 parts by weight of an organic peroxide with or without ingredient (e);

(g) optionally, 0.01–5.0 parts by weight of an inhibitor, as detailed below; and (h) Optionally, 0–100 parts by weight of non-reinforcing extending fillers.

Ingredient (a) (Polydiorganosiloxane)

Preferably, the polydiorganosiloxane has a viscosity within a range of about 0.03 to less than 100 Pa·s at 25° C. The polydiorganosiloxane can be represented by the general formula X(R1R2SiO)nX where R1 and R2 represent identical or different monovalent substituted or unsubstituted hydrocarbon radicals, the average number of repeating units in the polymer, represented by n, is selected to provide the desired viscosity, and the terminal group X represents an ethylenically unsaturated hydrocarbon radical. For example, when the composition is to be cured by a hydrosilylation reaction with an organohydrogensiloxane or a vinyl-specific peroxide, X is typically vinyl or other alkenyl radical.

The hydrocarbon radicals represented by R1 and R2 include alkyls comprising one to 20 carbons atoms such as methyl, ethyl, and tertiary-butyl; alkenyl radicals comprising one to 20 carbon atoms such as vinyl, allyl and 5-hexenyl; cycloalkyl radicals comprising three to about 20 carbon atoms such as cyclopentyl and cyclohexyl; and aromatic hydrocarbon radicals such as phenyl, benzyl, and tolyl. The R1 and R2 can be substituted with, for example, halogens, alkoxy, and cyano groups. The preferred hydrocarbon radicals are alkyls containing about one to four carbon atoms, phenyl, and halogen-substituted alkyls such as 3,3,3-trifluoropropyl. Most preferably R1 represents a methyl radical, R2 represents at least one of methyl, phenyl and 3,3,3-trifluoropropyl radicals, and X represents methyl or vinyl, and optionally one or more of the R2 radicals is alkenyl. The preferred polydiorganosiloxane is a dimethylvinylsiloxy endblocked polydimethylsiloxane having a viscosity within a range of about 0.3 to less than 100 Pa·s.

The polydiorganosiloxane of the present process can be a homopolymer, a copolymer or a mixture containing two or more different homopolymers and/or copolymers. When the composition prepared by the present process is to be cured by a hydrosilylation reaction, at least a portion of the polydiorganosiloxane can be a copolymer where X represents an alkenyl radical and a portion of the R2 radicals on non-terminal silicon atoms are optionally ethylenically unsaturated radicals such as vinyl and hexenyl.

Methods for preparing polydiorganosiloxanes having a viscosity within a range of about 0.03 to 300 Pa·s at 25° C. are well known and do not require a detailed discussion in this specification. One method for preparing these polymers is by the acid or base catalyzed polymerization of cyclic polydiorganosiloxanes that typically contain three or four siloxane units per molecule. A second method comprises replacing the cyclic polydiorganosiloxanes with the corresponding diorganodihalosilane(s) and an acid acceptor. Such polymerization are conducted under conditions that will yield the desired molecular weight polymer.

Ingredient (b) (Reinforcing Filler)

The type of reinforcing silica filler used in the present process is not critical and can be any of those reinforcing silica filler known in the art. The reinforcing silica filler can be, for example, a precipitated or pyrogenic silica having a surface area of at least 50 square meters per gram (M2/g). More preferred is when the reinforcing silica filler is a precipitated or pyrogenic silica having a surface area within a range of about 150 to 500 M2/g. The most preferred reinforcing silica filler is a pyrogenic silica having a surface area of about 370 to 420 M2/g. The pyrogenic silica filler can be produced by burning silanes, for example, silicon tetrachloride or trichlorosilane as taught by Spialter et al. U.S. Pat. No. 2,614,906 and Hugh et al. U.S. Pat. No. 3,043,660. The aforementioned fillers can be treated with a silazane, such as hexamethyldisilazane, an organosilane, organopolysiloxane, or other organic silicon compound. The amount of this ingredient added depends on the type of the inorganic filler used. Usually, the amount of this ingredient is in the range of 5 to 50 parts by weight per 100 parts by weight of ingredient (a).

Ingredient (c), (Oxide or Hydroxide of an Alkaline-Earth Metal)

The oxide or hydroxide of an alkaline-earth metal with an atomic weight of 40 or greater, is the characteristic ingredient of this invention. This ingredient is added to ensure that the cure product of our composition is not deteriorated by the PEM. Examples of the oxides and hydroxides of alkaline-earth metals include the oxides and hydroxides of calcium, strontium, and barium. They may be used either alone or as a mixture of two or more. Also, they may be used in the form of fine powders to ensure their effective dispersion in the silicone composition. Among them, calcium hydroxide and calcium oxide are preferred. The amount of this ingredient with respect to 100 parts by weight of ingredient (a) is in the range of 1 to 20 parts by weight, or preferably in the range of 6 to 12 parts by weight.

Ingredient (d) (Organohydrogensiloxane)

The organohydrogensiloxane containing 3 or more silicon-bonded hydrogen atoms in each molecule, is a crosslinking agent. Examples of organohydrogensiloxanes that are used include methylhydrogenpolysiloxane with both ends blocked by trimethylsiloxy groups, dimethylsiloxane/methyl-hydrogensiloxane copolymer with both ends blocked by trimethylsiloxy groups, methylphenylsiloxane/methyl-hydrogensiloxane copolymer with both ends blocked by dimethylphenylsiloxy groups, cyclic methylhydrogenpoly-siloxane, and a copolymer made of dimethyl-hydrogen siloxy units and SiO4/2 units. A fluorosilicone crosslinker such as methyltrifluoropropyl/methyl-hydrogen siloxane copolymer with both ends blocked with dimethyl hydrogen groups can be used, particularly when the mole percent of methylotrifluoropropyl is greater than 50%. The amount of organohydrogensiloxane added is appropriate to ensure that the molar ratio of the silicon-bonded hydrogen atoms in this ingredient to the silicon-bonded alkenyl groups in ingredient (a) is in the range of 0.4:1 to 5:1. Otherwise, it is impossible to obtain good curing properties.

Ingredient e, (Platinum Group Catalyst)

The platinum-group catalyst, is a catalyst for curing the composition. Examples of useful catalysts include fine platinum powder, platinum black, chloroplatinic acid, platinum tetrachloride, olefin complexes of chloroplatinic acid, alcohol solutions of chloroplatinic acid, complexes of chloroplatinic acid and alkenylsiloxanes, or like compounds of rhodium and palladium. The amount of the platinum-group catalyst added is usually that providing 0.1 to 500 parts by weight of platinum-type metal atoms per 1 million parts by weight of ingredient (a). If the amount is smaller than 0.1 part, the curing reaction may not proceed sufficiently; if the amount is over 500 parts, the cost effectiveness is very poor.

Optionally ingredient (e) could be in the form of a spherical-shaped fine-grain catalyst made of a thermoplastic resin containing 0.01 wt % or more of platinum metal atoms, as there is no catalyst poisoning effect caused by ingredient (c). Also, to ensure that the platinum-type catalyst ingredient is dispersed quickly into the composition at the conventional molding temperature, the softening point of the thermoplastic resin should be in the range of about 50 to 150° C. Also, the average grain size of the spherical-shaped fine-grain catalyst is in the range of 0.01 to 10 micron.

Exemplary encapsulated catalysts are disclosed in U.S. Pat. No. 4,766,176 (Aug. 23, 1988); U.S. Pat. No. 4,784,879 (Nov. 15, 1988); U.S. Pat. No. 4,874,667 (Oct. 17, 1989; and U.S. Pat. No. 5,077,249 (Dec. 31, 1991), all to Dow Corning Corporation, and the contents of which are hereby incorporated by reference.

Ingredient (f) (Organic Peroxide Curing Agent)

Ingredient (f) consists of a suitable organic peroxide curing agent which aids to forming a cured silicone elastomer. The organic peroxides can be those typically referred to as vinyl-specific, and which require the presence of vinyl or other ethylenically unsaturated hydrocarbon substituent in the polydiorganosiloxane. Vinyl-specific peroxides which may be useful as curing agents in the curable liquid silicone rubber compositions include alkyl peroxides such as 2,5-bis (t-butylperoxy)-2,3-dimethylhexane. The organic peroxide can be those referred to as non-vinyl specific and which react with any type of hydrocarbon radical to generate a free radical.

Optional Ingredient (g) (Inhibitor)

Optionally an inhibitor to allow sufficient the composition to have a suitable working life to allow for processing may be necessary, As exemplified by alkyne alcohols such as 3,5-dimethyl-1-hexyn-3-ol, 1-ethynyl-1-cyclohexanol and phenylbutynol; ene-yne compounds such as 3-methyl-3-penten-1-yne and 3,5-dimethyl-3-hexen-1-yne; tetramethyltetrahexenyl-cyclotetrasiloxane; benzotriazole; and others.

Optional Ingredient (h) (Non-Reinforcing Extending Filler)

Ingredient (h) can be, but is not limited to, a non-reinforcing extending filler selected from the quartz powder, diatomaceous earth, iron oxide, aluminum oxide calcium carbonate, and magnesium carbonate.

The composition of this invention is easily manufactured by uniformly blending the requisite ingredients. Optionally, other additives may be added, including curing agents, inhibitors, heat resistant agents, flame-retarding agents, and pigments. This blending can be performed by means of a kneader mixer, a pressurized kneader mixer, Ross™ mixer, and other blenders. The composition may also be prepared as two or more liquids, which are blended immediately before use, to facilitate manufacturing and to improve the workability.

In the following, this aspect of the invention, the elastomeric seal material, will be explained in more detail with reference to specific examples. In the examples, parts refer to parts by weight and the viscosity refers to the value at 25° C.

EXAMPLE 1

TABLE I

Composition of Silicone Base Material

| Parts | Ingredient |
|---|---|
| 100 | Dimethylsiloxane, Dimethylvinylsiloxy-terminated |
| 40 | Quartz |
| 40 | Silica, Amorphous, Fumed |
| 13 | Hexamethyldisilazane |
| 0.4 | Tetramethyldivinyldisilazane |
| 3 | Dimethylsiloxane, Hydroxy-terminated |

100 parts of a polydimethylsiloxane which is dimethylvinylsiloxy terminated and has a viscosity of 55,000 cp; 3 parts of dimethylsiloxane which is hydroxy terminated and has an viscosity of 41 cp; 40 parts quartz silica with an average particle size of 5μ; and 40 parts of fumed silica (with an average surface area of 400 m2/g) that has been surface-treated with 13 parts hexamethyldisilazane and 0.4 parts tetramethyldivinyldisilazane were blended until homogeneity was achieved. After blending, material was heat treated under vacuum to remove ammonia and trace volatiles, and note that in general it is desirable to carry out this step for all the compositions described here to form a base material. This provides a shelf stable composition. Final material is a flowable silicone paste that can be extruded through an ⅛" orifice a rate of 30 g/min under 90 psig pressure.

TABLE II

Composition of Silicone Material A

| Parts | Ingredients |
|---|---|
| 100 | Silicone Base Material |
| 56 | Dimethylsiloxane, Dimethylvinylsiloxy-terminated |
| 34 | Dimethyl, Methylvinylsiloxane, Dimethylvinylsiloxy-terminated |
| 12 | Calcium Hydroxide |
| 0.7 | 1,3-Diethenyl-1,1,3,3-Tetramethyldisiloxane Platinum Complexes |

100 parts of silicone base material (as mentioned in Table 1 above); 56 parts dimethylpolysiloxane that is dimethylvinylsiloxy terminated on both ends and has a viscosity of 55,000 cp; 34 parts dimethyl, methylvinylsiloxane which is dimethylvinylsiloxy terminated and has a viscosity of 350 cp; 12 parts of calcium hydroxide which is certified 99% pure and contains a sulfur content of less than 0.1%; and 0.7 parts of 1,3-diethenyl-1,1,3,3-tetramethyldisiloxane platinum complexes which contains an amount of platinum metal atoms equaling 0.52 wt % were blended until homogeneity. Final material is a flowable liquid silicone with a viscosity of 128,000 cp at 23° C.

TABLE III

Composition of Silicone Material B

| Parts | Ingredients |
|---|---|
| 100 | Silicone Base Material |
| 55 | Dimethylsiloxane, Dimethylvinylsiloxy-terminated |
| 34 | Dimethyl, Methylvinylsiloxane Dimethylvinylsiloxy-terminated |

TABLE III-continued

Composition of Silicone Material B

| Parts | Ingredients |
|---|---|
| 5 | Dimethylhydrogensiloxy-Modified Siloxane Resin |
| 0.2 | 1-Ethynyl-1-Cyclohexanol |

100 parts of silicone base material (as mentioned in Table 1 above); 55 parts dimethylpolyiloxane that is dimethylvinylsiloxy terminated on both ends and has a viscosity of 55,000 cp; 34 parts dimethyl, methylvinylsiloxane which is dimethylvinylsiloxy terminated and has a viscosity of 350 cp; 5 parts of dimethylhydrogensiloxy-modified siloxane resin with 0.96 wt % silicone-atom-bonded hydrogen atoms and a viscosity of 25 cp; and 0.2 parts 1-ethynyl-1-cyclohexanol which is 99% pure for use as an inhibitor to the mixed system were blended until homogeneity. The final material is a flowable liquid silicone with a viscosity of 84,000 cp.

The final compositions of material A and material B from above when mixed in a 50:50 ratio and press molded at 150° C. for 5 minutes exhibit the following characteristics:

TABLE IV

Results of Test of Cured Elastomer

| Property | ASTM Method* | Result |
|---|---|---|
| Durometer (Shore A) | ASTM D2240 | 43 |
| Tensile, at Break (psi) | ASTM 412 | 655 |
| Elongation at Break (%) | ASTM 412 | 235 |
| Tear, Die B (ppi) | ASTM 625 | 25 |
| Modulus, at 100% (psi) | ASTM 412 | 248 |

*Note tests based on the above referenced ASTM Method.

As stated previously, the seal material must be resistant to degradation by contact with fuel cell components and fluids. Of specific importance is resistance to the PEM operating environment and resistance to swell in various liquids that may be used as coolants or reactant gases.

Several methods were used to determine the resistance to the PEM operating environment. For example, sheets of seal material were placed in contact with sheets of PEM material, rolled tightly and held in position with appropriate banding. Such rolls were then placed in acidic fluids and, separately, heated DI water to provide an accelerated aging test. Such a test was completed with DI water heated to 100° C. for the seal materials listed previously. After 8 months of exposure the material was not hardened or cracked.

Data on general resistance to degradation by the various cooling fluids used in fuel cells is available in generic product literature. An additional specific requirement is that the seal material not be excessively swelled by contact with the coolant. Standard methods for determining volume swell at standard or elevated temperature were completed for the seal materials listed previously. Volume swell of less than 1% at temperature of 82° C. for 72 hours was observed for these materials in DI water, ethylene glycol/water solution and propylene glycol/water solution.

A stack of fuel cell elements was assembled using the following procedure (with reference to the structure of FIG. 5): 1), place an aluminum anode end plate 102 flat on a horizontal surface, with the seal groove segments facing up; 2), place a high-density polyethylene insulator plate 112 on the anode end plate, locating the plate so the seal groove segments on each plate align with each other; 3), place a gold-plated nickel anode bus bar plate 116 on the insulator plate, locating the plate so the seal groove segments on each plate align with each other; 4), place an anode bipolar flow field plate 120 on the insulator plate with the active area facing up, aligning the groove segments and apertures of each plate; 5), place a GDM ply 122, cut to fit in the recessed surface active area of the anode bipolar flow field plate; 6), place a PEM ply 124 on the anode bipolar flow field plate and GDM, making sure that the apertures for flowing seal material are aligned with the aperture on the flow field plate; 7), place a GDM ply 126, cut to fit in the recessed surface active area of the cathode bipolar flow field plate; 8), place a cathode bipolar flow field plate 130 on the assembly, with the active area facing down; 9), place a gold-plated nickel cathode bus bar plate 118 on the assembly, locating the plate so the seal groove segments and apertures align; 10), place a high-density polyethylene insulator plate 114 on the assembly, locating the plate so the seal groove segments and the apertures on each plate align with each other; 11), place the aluminum cathode end plate 104 on the assembly, with the seal groove segments facing down; 12), place perimeter bolts or tie rods 131 through the cathode end plate 104 that extend to screw into the anode end plate 102; 13), tighten the perimeter bolts 131 to provide even clamping of the assembly elements, items 1) through 11).

As detailed in FIG. 16a, dispensing hoses 212 were connected to a two-part silicone material dispensing machine 214, that includes a static mixer to thoroughly mix the two parts of the silicone seal material described above. The dispensing hoses were also connected to the threaded connection ports 194 on the aluminum cathode end plate 104. The silicone material was then injected into the assembled elements at a pressure that reached 100 psig over a 20–30 second interval. The peak pressure of 100 psig was held until material is seen exiting the vent groove segments in each of the assembly plates. The dispensing pressure was then decreased to zero. The dispensing hoses were removed and the ports 194 closed with the plugs 200. The stack assembly was placed in an oven preheated to 80° C., and kept in the oven until the seal material was completely cured. The stack assembly was then removed from the oven and allowed to cool to room temperature. The perimeter bolts were retightened to a uniform torque. The stack assembly was then ready to be placed in a fuel cell system.

EXAMPLE 2

As in Example 1 above, elements of the fuel cell stack were assembled as in step (1)–(13) above. Again, a dispensing hose was connected to a threaded connection port 194 on the aluminum cathode end plate 104. The silicone material was dispersed into the assembled elements at a pressure that reaches 200 psig over a 30–40 second interval. The peak pressure of 200 psig was held until material was seen exiting the vent groove segments in each of the assembly plates, when the dispensing pressure was decreased to zero. The dispensing hoses were removed, and plugs 200 inserted as before. The stack assembly was placed in an oven preheated to 80° C., and kept in the oven until the seal material was completely cured. The stack assembly was then removed from the oven and allowed to cool to room temperature. The perimeter bolts were tightened to a uniform torque. The stack assembly was then ready to be placed in a fuel cell system.

EXAMPLE 3

Three additional examples were prepared, and these additional exemplary compositions were injected into a fuel cell stack and cured, as detailed above for examples 1 and 2. For simplicity and brevity, in the following example, details of the assembly and injection technique are not repeated; just the details of the compositions are given.

TABLE I

Composition of Silicone Material A

| Parts | Ingredients |
|---|---|
| 111.0 | Dimethyl, Trifluoropropylmethyl Siloxane, Dimethylvinylsiloxy-terminated |
| 39.0 | Silica, Amorphous, Fumed |
| 6.6 | Hexamethyldisilazane |
| 5.0 | 1,3-Diethenyl-1,1,3,3-Tetramethyldisiloxane Platinum Complexes |
| 2.9 | Decamethylcyclopentasiloxane |
| 1.0 | Dimethyl, Methylvinyl Siloxane, Hydroxy-terminated |

100 parts of a polydimethylsiloxane which is dimethylvinylsiloxy terminated, is 30 mole % methyltrifluoropropyl, and had a viscosity of 9,300 cst; 1 part of dimethylmethylvinylsiloxane which is hydroxy terminated and had a viscosity of 40 cst; and 39 parts of fumed silica (with an average surface area of 250 m2/g) that had been surface-treated with 6.6 parts hexamethyldisilazane were blended until homogeneity was achieved. After blending, the material was heat treated under vacuum, again to remove volatiles, to form a base material. This was then cut back or diluted with 11 parts of polydimethylsiloxane which is dimethylvinylsiloxy terminated, is 30 mole % methyltrifluoropropyl, and had a viscosity of 680 cst; 2.9 parts decamethylcyclopentasiloxane that had a viscosity of 25 cst; and 5 parts of 1,3-diethenyl-1,1,3,3-tetramethyldisiloxane platinum complexes which contained an amount of platinum metal atoms equaling 0.52 wt %. The complete composition was blended until homogeneity. The final material or composition was a flowable silicone paste that could be extruded through an ⅛" orifice at a rate of 186.9 g/min under 90 psig pressure.

TABLE II

Composition of Silicone Material B

| Parts | Ingredients |
|---|---|
| 110.0 | Dimethyl, Trifluoropropylmethyl Siloxane, Dimethylvinylsiloxy-terminated |
| 38.0 | Silica, Amorphous, Fumed |
| 6.4 | Hexamethyldisilazane |
| 3.8 | Dimethyl, Hydrogensiloxy - Modified Silica |
| 1.0 | Dimethyl, Methylvinyl Siloxane, Hydroxy-terminated |
| 0.2 | 1-Ethynyl-1-Cyclohexanol |

100 parts of a polydimethylsiloxane which is dimethylvinylsiloxy terminated, is 30 mole % methyltrifluoropropyl, and had a viscosity of 9,300 cst; 1 part of dimethylmethylvinylsiloxane which is hydroxy terminated and had a viscosity of 40 cst; and 38 parts of fumed silica (with an average surface area of 250 m2/g) that had been surface-treated with 6.4 parts hexamethyldisilazane were blended until homogeneity was achieved. After blending, the material was heat treated under vacuum to drive off volatiles, so as to form a base material. This was then cut back or diluted with 10 parts of polydimethylsiloxane which is dimethylvinylsiloxy terminated, is 30 mole % methyltrifluoropropyl, and had a viscosity of 680 cst; 3.8 parts of dimethyl, hydrogensiloxy—modified silica with 0.96 wt % silicone-atom-bonded hydrogen atoms and a viscosity of 25 cp; and 0.2 parts 1-ethynyl-1-cyclohexanol which was 99% pure, for use as an inhibitor to the mixed system. The complete composition was blended until homogeneity. The final material or composition was a flowable silicone paste that could be extruded through an ⅛" orifice at a rate of 259.5 g/min under 90 psig pressure.

The final compositions of material A and material B from above when mixed in a 50:50 ratio and press molded at 171° C. for 5 minutes and post cured for 4 hours at 200° C. exhibited the following characteristics:

TABLE III

Results of Test of Cured Elastomer

| Property | ASTM Method* | Result |
|---|---|---|
| Durometer (Shore A) | ASTM D2240 | 44 |
| Tensile, at Break (psi) | ASTM 412 | 693 |
| Elongation at Break (%) | ASTM 412 | 293 |
| Tear, Die B (ppi) | ASTM 625 | 101 |
| Modulus, at 100% Elongation (psi) | ASTM 412 | 193 |

*Note tests based on the above referenced ASTM Method.

EXAMPLE 4

TABLE I

Composition of Silicone Material A

| Parts | Ingredients |
|---|---|
| 111.0 | Dimethyl, Trifluoropropylmethyl Siloxane, Dimethylvinylsiloxy-terminated |
| 39.0 | Silica, Amorphous, Fumed |
| 6.6 | Hexamethyldisilazane |
| 5.0 | 1,3-Diethenyl-1,1,3,3-Tetramethyldisiloxane Platinum Complexes |
| 2.9 | Decamethylcyclopentasiloxane |
| 1.0 | Dimethyl, Methylvinyl Siloxane, Hydroxy-terminated |

100 parts of a polydimethylsiloxane which is dimethylvinylsiloxy terminated, is 40 mole % methyltrifluoropropyl, and had a viscosity of 25,000 cst; 1 part of dimethylmethylvinylsiloxane which is hydroxy terminated and had a viscosity of 40 cst; and 39 parts of fumed silica (with an average surface area of 250 m2/g) that had been surface-treated with 6.6 parts hexamethyldisilazane were blended until homogeneity was achieved. After blending, the material was heated to remove volatiles, so as treated under vacuum to form a base material. This was then cut back or diluted with 11 parts of the copolymer which is dimethylvinylsiloxy terminated, is 40 mole % methyltrifluoropropyl, and had a viscosity of 750 cst; 2.9 parts decamethylcyclopentasiloxane that had a viscosity of 25 cst; and 5 parts of 1,3-diethenyl-1,1,3,3-tetramethyldisiloxane platinum complexes which contained an amount of platinum metal atoms equaling 0.52 wt %. The complete composition was blended until homogeneity. The final material was a flowable silicone paste that could be extruded through an ⅛" orifice at a rate of 184 g/min under 90 psig pressure.

TABLE II

Composition of Silicone Material B

| Parts | Ingredients |
|---|---|
| 110.0 | Dimethyl, Trifrluoropropylmethyl Siloxane, Dimethylvinylsiloxy-terminated |
| 38.0 | Silica, Amorphous, Fumed |
| 6.4 | Hexamethyldisilazane |
| 3.8 | Dimethyl, Hydrogensiloxy - Modified silica |
| 1.0 | Dimethyl, Methylvinyl Siloxane, Hydroxy-terminated |
| 0.2 | 1-Ethynyl-1-Cyclohexanol |

100 parts of a polydimethylsiloxane which is dimethylvinylsiloxy terminated, is 40 mole % methyltrifluoropropyl, and had a viscosity of 25,000 cst; 1 part of dimethylmethylvinylsiloxane which is hydroxy terminated and had a viscosity of 40 cst; and 38 parts of fumed silica (with an average surface area of 250 m2/g) that had been surface-treated with 6.4 parts hexamethyldisilazane and were blended until homogeneity was achieved. After blending, the material was heat treated to remove volatiles, so as to form a base material. This was then cut back or diluted with 10 parts of polydimethylsiloxane which is dimethylsiloxy terminated, is 40 mole % methyltrifluoropropyl, and had a viscosity of 750 cst; 3.8 parts of dimethyl, hydrogensiloxy—modified silica with 0.96 wt % silicone-atom-bonded hydrogen atoms and a viscosity of 25 cp; and 0.2 parts 1-ethynyl-1-cyclohexanol which was 99% pure for use as an inhibitor to the mixed system. The complete composition was blended until homogeneity. The final material was a flowable silicone paste that could be extruded through an ⅛" orifice at a rate of 225 g/min under 90 psig pressure.

The final compositions of material A and material B from above when mixed in a 50:50 ratio and press molded at 171° C. for 5 minutes and post cured for 4 hours at 200° C. exhibit the following characteristics:

TABLE III

Results of Test of Cured Elastomer

| Property | ASTM Method* | Result |
|---|---|---|
| Durometer (Shore A) | ASTM D2240 | 42 |
| Tensile, at Break (psi) | ASTM 412 | 900 |
| Elongation at Break (%) | ASTM 412 | 420 |
| Tear, Die B (ppi) | ASTM 625 | 130 |
| Modulus, at 100% Elongation (psi) | ASTM 412 | 260 |

*Note tests based on the above referenced ASTM Method.

As indicated above, in relation to Example 1, the seal material must be resistant to degradation by fuel cell components. Of specific importance is resistance to the PEM operating environment and resistance to swell in various liquids that may be used as coolants.

Several methods were used to determine resistance to the PEM operating environment. For example, sheets of seal material were placed in contact with sheets of PEM material, rolled tightly and held in position with appropriate banding. Such rolls were then placed in acidic fluids and, separately, heated DI water to provide an accelerated aging test. Such a test was completed with DI water heated to 100 degrees ° C. for the seal materials listed previously. After 1 month of exposure the material was not hardened or cracked.

EXAMPLE 5

TABLE I

Composition of Silicone Material A

| Parts | Ingredients |
|---|---|
| 111.0 | Dimethyl, Trifluoropropylmethyl Siloxane, Dimethylvinylsiloxy-terminated |
| 39.0 | Silica, Amorphous, Fumed |
| 6.6 | Hexamethyldisilazane |
| 5.0 | 1,3-Diethenyl-1,1,3,3-Tetramethyldisiloxane Platinum Complexes |
| 2.9 | Decamethylcyclopentasiloxane |
| 1.0 | Dimethyl, Methylvinyl Siloxane, Hydroxy-terminated |

100 parts of a dimethylsiloxane which is dimethylvinylsiloxy terminated, is 70 mole % methyltrifluoropropyl, and had a viscosity of 20,000 cst; 1 part of dimethylmethylvinylsiloxane which is hydroxy terminated and had a viscosity of 40 cst; and 39 parts of fumed silica (with an average surface area of 250 m2/g) that had been surface-treated with 6.6 parts hexamethyldisilazane were blended until homogeneity was achieved. After blending, the material was heat treated under vacuum, to remove volatiles, so as to form a base material. This was then cut back or diluted with 11 parts of polydimethylsiloxane which is dimethylvinylsiloxy terminated, is 70 mole % methyltrifluoropropyl, and had a viscosity of 1500 cst; 2.9 parts decamethylcyclopentasiloxane that had a viscosity of 25 cst; and 5 parts of 1,3-diethenyl-1,1,3,3-tetramethyldisiloxane platinum complexes which contained an amount of platinum metal atoms equaling 0.52 wt %. The complete composition was blended until homogeneity. The final material was a flowable silicone paste that could be extruded through an 1/8" orifice at a rate of (136) g/min under 90 psig pressure.

TABLE II

Composition of Silicone Material B

| Parts | Ingredients |
|---|---|
| 110.0 | Dimethyl, Trifluoropropylmethyl Siloxane, Dimethylvinylsiloxy-terminated |
| 38.0 | Silica, Amorphous, Fumed |
| 6.4 | Hexamethyldisilazane |
| 3.8 | Dimethyl, Hydrogensiloxy - modified silica |
| 1.0 | Dimethyl, Methylvinyl Siloxane, Hydroxy-terminated |
| 0.2 | 1-Ethynyl-1-Cyclohexanol |

100 parts of a dimethylsiloxane which is dimethylvinylsiloxy terminated, is 70 mole % methyltrifluoropropyl, and had a viscosity of 20,000 cst; 1 part of dimethylmethylvinylsiloxane which is hydroxy terminated and had a viscosity of 40 cst; and 38 parts of fumed silica (with an average surface area of 250 m2/g) that had been surface-treated with 6.4 parts hexamethyldisilazane and were blended until homogeneity was achieved. After blending, the material was heat treated under vacuum, to remove volatiles, so as to form a base material. This was then cut back or diluted with 10 parts of the polydimethylsiloxane which is dimethylvinylsiloxy terminated, is 70 mole % methyltrifluoropropyl, and had a viscosity of 1500 cst; 3.8 parts of dimethyl, hydrogensiloxy—modified silica with 0.96 wt % silicone-atom-bonded hydrogen atoms and a viscosity of 25 cp; and 0.2 parts 1-ethynyl-1-cyclohexanol which was 99% pure for use as an inhibitor to the mixed system. The complete composition was blended until homogeneity. The final material was a flowable silicone paste that could be extruded through an 1/8" orifice at a rate of (189) g/min under 90 psig pressure.

The final compositions of material A and material B from above when mixed in a 50:50 ratio and press molded at 171° C. for 5 minutes and post cured for 4 hours at 200° C. exhibit the following characteristics:

TABLE III

Results of Test of Cured Elastomer

| Property | ASTM Method* | Result |
|---|---|---|
| Durometer (Shore A) | ASTM D2240 | 46 |
| Tensile, at Break (psi) | ASTM 412 | 822 |
| Elongation at Break (%) | ASTM 412 | 384 |
| Tear, Die B (ppi) | ASTM 625 | 112 |

*Note tests based on the above referenced ASTM Method.

The material was tested for degradation and compatibility with other PEM components, as for Examples 1 and 4. Thus sheets of seal material were placed in contact with sheets of PEM material, rolled tightly and held in position with appropriate banding. Such rolls were then placed in acidic fluids and, separately, heated DI water to provide an accelerated aging test.

Such a test was completed with DI water heated to 100 degrees C. for the seal materials listed previously. After 1 month of exposure the material was not hardened or cracked.

Several alternative elastomeric materials may be used to form the seals instead of the polysiloxane elastomeric materials described above providing they have a suitable viscosity and rheology. These alternative elastomeric materials may, for example, include one or more of the following: Ethylene Acrylic Polymers such as those sold under the trademark Vamac, Fluoro elastomers such as those sold under the trademark Viton and Ethylene Propylene Terpolymers such as those sold under the trademark Nordel (Viton and Nordel are all Registered trademarks of Du Pont Dow Elastomers L.L.C Corp. and Vamac is a registered trademark of E.I. du Pont de Nemours and Co Corp.). Other alternative elastomeric materials may include Epoxy resins and thermoplastic elastomers. It is to be noted however that in some cases these materials would need to be heated prior to filling the stack seal area and/or would not require curing, i.e. thermoplastics set by supplying them at a high temperature, above their melting point, and permitting them to cool to a temperature below their melting point, to cause them to set or become hard.

The invention claimed is:

1. A method of forming a seal in an electrochemical cell assembly comprising a plurality of separate elements including a plurality of plates, the method comprising:
    (a) assembling the separate elements of the electrochemical cell together;
    (b) providing at least one plate with a connection aperture and, providing at least one groove network extending between the separate elements and through each connection aperture and providing a filling port open to the exterior and in communication with the at least one groove network;
    (c) connecting a source of liquid seal material to the filling port and injecting the seal material into the at least one groove network to fill the at least one groove network and simultaneously venting gas from the at least one groove network; and
    (d) causing the seal material to set, to form a seal in the at least one groove network.

2. A method as claimed in claim 1, which includes filling the at least one groove network for a predetermined time at a predetermined pressure, to ensure filling of the at least one groove network.

3. A method as claimed in claim 2, which includes providing said separate elements with groove segments, for forming the at least one groove network, and cleaning the groove segments prior to assembling the separate elements, to promote bonding of the seal material to the separate elements.

4. A method as claimed in claim 3, which includes providing surfaces of the separate elements with a primer, to promote bonding of the seal material thereto.

5. A method as claimed in claim 4, which includes priming the separate elements by one of:
applying a primer in liquid form to the separate elements;
plating a primer onto the separate elements; and
incorporating a primer material within the material of selected separate elements so as to improve the bonding capability of the surface of each such separate element to the seal material.

6. A method as claimed in claim 2, which includes providing a liquid silicone elastomeric material as the seal material and curing the seal material at an elevated temperature for a predetermined time.

7. A method as claimed in claim 6, which includes curing the seal material by passing heated water through the electrochemical cell assembly.

8. A method is claimed in claim 6, which includes preheating the assembled stack, prior to filling with groove network with seal material.

9. A method as claimed in claim 2, which includes providing, for each electrochemical cell, a proton exchange membrane, and opposed cathode and anode flow field plates on either side of the proton exchange membrane, and offset grooves in the opposed flow field plates to prevent distortion of the proton exchange membrane during delivery of the liquid seal material.

10. A method as claimed in claim 1, which includes forming at least one vent for venting air from the groove network by scratching a surface of at least one of said separate elements.

11. A method as claimed in claim 1, which includes delivering the liquid seal material at a pressure in the range 1–2000 psig, more preferably in the range of 80–300 psig.

12. A method as claimed in claim 1, which includes providing at least two separate groove networks, injecting a separate liquid seal material into each groove network of the electrochemical cell assembly and selecting the composition of each liquid seal material, to provide compatibility with materials and liquids required for ectrochemical cell operation and durability.

13. A method as claimed in claim 1, in which the liquid seal material comprises at least one of: an ethylene/acrylic polymer; a fluoro elastomer; and an Ethylene Propylene Terpolymer.

14. A method as claimed in claim 1, in which the liquid seal material comprises one of a flexible and a rigid epoxy resin, and wherein step (d) comprises curing the resin.

15. A method as claimed in claim 1, in which the liquid seal material comprises a thermoplastic elastomer, and wherein step (c) comprises supplying the thermoplastic elastomer in a liquid state, and step (d) comprises causing the thermoplastic elastomer to set.

16. A method as claimed in claim 15, in which the thermoplastic elastomer comprises a polyester elastomer.

17. A method of forming a seal in an electrochemical cell assembly comprising a plurality of separate elements, the method comprising:
(a) providing the separate elements with groove segments to form at least one groove network and providing at least one connection aperture in one of the plurality of separate elements, with the groove network extending between the plurality of separate elements and through each connection aperture;
(b) assembling the separate elements together in abutting relationship;
(c) providing a filling port open to the exterior and in communication with the at least one groove network;
(d) connecting a source of liquid seal material to the filling port and injecting the seal material into the at least one groove network to fill the at least one groove network, the seal material being injected for a predetermined time and at a predetermined pressure, to ensure filling of the at least one groove network, while simultaneously venting gas from the at least one groove network; and
(e) causing the seal material to set to form a seal in the at least one groove network.

18. A method as claimed in 17, which includes mounting the assembled elements in a mold and injecting the seal material around the exterior of the electrochemical cell assembly and simultaneously permitting seal material to flow into the groove network from the exterior, thereby to form said seal and to insulate said stack assembly.

19. A method as claimed in claim 17, which includes providing a membrane electrode assembly including, a proton exchange membrane and gas diffusion media on both sides of the proton exchange membrane, and providing the proton exchange membrane with an external mounting flange, and causing the seal material to bond to the mounting flange, to seal the membrane electrode assembly in position.

20. A method as claimed in claim 19, which includes providing a plurality of electrochemical cells within the electrochemical cell assembly, providing each electrochemical cell with a pair of flow field plates and a corresponding membrane electrode assembly, providing the mounting flange and the gas diffusion media extending to peripheries of the flow field plates, providing connection apertures for the at least one groove network extending through at least one flow field plate and providing a seal for each electrochemical cell around the edges of the flange and the gas diffusion media and bonded to the flow field plates.

21. A method as claimed in claim 17, which includes providing a membrane electrode assembly including a proton exchange membrane and gas diffusion media on both sides of the proton exchange membrane, and having the seal material to bond to the proton exchange membrane.

22. A method as claimed in claim 21, which includes providing a plurality of electrochemical cells within the electrochemical cell assembly, providing each electrochemical cell with a pair of flow field plates and a corresponding membrane exchange assembly, providing the proton exchange membrane and the gas diffusion media extending to peripheries of the flow field plates, providing connection apertures for the at least one groove network extending through at least one flow field plate and providing a seal for each electrochemical cell around the edges of the proton exchange membrane and the gas diffusion media and bonded to the flow field plates.

23. A method as claimed in 17, which includes, for each electrochemical cell in the electrochemical cell assembly, providing an anode flow field plate and a cathode flow field plate having facing, front surfaces, providing groove segments in said facing, front faces of the anode and cathode flow field plates defining a groove extending around the periphery of the membrane exchange assembly, and providing a membrane exchange assembly with a periphery which terminates in said groove without extending all the way across the groove.

24. A method as claimed in claim 23, which includes providing, as the membrane exchange assembly, a proton exchange membrane between the anode and cathode flow field plates and a gas diffusion layer on both sides of the proton exchange membrane, providing each of the anode and cathode flow field plates with a recess to accommodate one of the gas diffusion layers, and clamping the anode and cathode flow field plates, such that pressure on the gas diffusion layers is determined by depths of said recesses and is unaffected by injection of the seal material.

25. A method as claimed in 17, which includes aligning the separate elements and clamping the said separate elements to apply a clamping pressure, prior to injecting the seal material.

26. A method as claimed in claim 25, which includes, after curing the seal material, one of removing the clamping of the elements whereby the seal material maintains the separate elements bonded to one another, and adjusting the clamping pressure to a final clamping pressure.

27. A method as claimed in claim 25, which includes, after clamping the separate elements together, mounting the separate elements in a mold and providing connection apertures between the groove network within the electrochemical cell assembly and the exterior thereof, and injecting the seal material into the mold around the exterior of the electrochemical cell assembly, whereby the seal material covers the exterior of the electrochemical cell assembly and flows through said connection apertures into the internal groove network.

28. A method as claimed in claim 27, which includes providing the mold with a profile to define individual external seals at joints between adjacent elements of the electrochemical cell assembly.

29. A method of forming a seal in an electrochemical cell assembly comprising a plurality of separate elements, the method comprising:
   (a) assembling the separate elements of the electrochemical cell assembly together;
   (b) providing at least one groove network extending through the separate elements, providing at lease one connection aperture for the groove network in at east one element, and providing a filling port open to the exterior in communication with the at least one groove network, whereby the at least one groove network extends between the elements and through each connection aperture;
   (c) connecting a source of liquid seal material to the filling port and injecting the seal material into the at least one groove network to fill the at least one groove network and simultaneously venting gas from the at least one groove network; and
   (d) causing the seal material to set, to form a seal in the at least one groove network, to define at least one chamber for a fluid for operation of the electrochemical cell assembly.

30. A method as claimed in claim 29, in which the liquid seal material comprises one of a flexible and a rigid epoxy resin, and wherein step (d) comprises curing the resin.

31. A method as claimed in claim 30, in which the liquid seal material comprises a thermoplastic elastomer, and wherein step (c) comprises supplying the thermoplastic elastomer in a liquid state, and step (d) comprises causing the thermoplastic elastomer to set.

* * * * *